(12) United States Patent
Nakahara

(10) Patent No.: US 11,018,915 B2
(45) Date of Patent: May 25, 2021

(54) WIRELESS ANALYSIS DEVICE AND WIRELESS ANALYSIS METHOD

(71) Applicant: FUJITSU LIMITED, Kawasaki (JP)

(72) Inventor: Shiho Nakahara, Nerima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/293,470

(22) Filed: Mar. 5, 2019

(65) Prior Publication Data

US 2019/0200303 A1    Jun. 27, 2019

Related U.S. Application Data

(63) Continuation of application No. PCT/JP2017/046381, filed on Dec. 25, 2017.

(30) Foreign Application Priority Data

Jan. 11, 2017 (JP) .............................. JP2017-002319

(51) Int. Cl.
*H04W 24/08* (2009.01)
*H04B 17/309* (2015.01)
(Continued)

(52) U.S. Cl.
CPC ........... *H04L 27/2614* (2013.01); *H04B 1/10* (2013.01); *H04B 17/309* (2015.01);
(Continued)

(58) Field of Classification Search
None
See application file for complete search history.

(56) References Cited

U.S. PATENT DOCUMENTS

| 4,399,512 A * | 8/1983 | Soma ................. G01R 13/06 |
| | | 324/121 R |
| 7,143,328 B1 * | 11/2006 | Altmann ............... H04L 1/0061 |
| | | 714/746 |

(Continued)

FOREIGN PATENT DOCUMENTS

| JP | 06-289072 A | 10/1994 |
| JP | 06-326566 A | 11/1994 |

(Continued)

OTHER PUBLICATIONS

International Search Report and Written Opinion, issued by International Searching Authority in corresponding International Application No. PCT/JP2017/046381, dated Mar. 20, 2018. (PCT/ISA/210, PCT/ISA/237 & PCT/ISA/237).

*Primary Examiner* — Gennadiy Tsvey
(74) *Attorney, Agent, or Firm* — Arent Fox LLP

(57) ABSTRACT

A wireless analysis device includes a memory configured to store information on a frequency spectrum of an incoming wave and information on a plurality of edges including a rising and falling edges of a signal included in the incoming wave, and a processor coupled to the memory and configured to compare a power change amount of the frequency spectrum at a first edge of the plurality of edges with a first threshold value for each frequency, specify a frequency range in which the power change amount is larger than the first threshold value, set a second threshold value based on a sum of the power change amount within the frequency range, and specify a second edge in which a sum of powers in the frequency range changes over the second threshold value among the plurality of edges, the second edge having different directions of power change from the first edge.

11 Claims, 18 Drawing Sheets

(51) Int. Cl.
*H04B 1/10* (2006.01)
*H04L 27/26* (2006.01)
*H04W 52/34* (2009.01)
*H04W 52/36* (2009.01)
*H04L 12/26* (2006.01)

(52) U.S. Cl.
CPC .......... *H04L 27/2666* (2013.01); *H04L 43/16* (2013.01); *H04W 24/08* (2013.01); *H04W 52/346* (2013.01); *H04W 52/367* (2013.01)

(56) References Cited

U.S. PATENT DOCUMENTS

| | | | | |
|---|---|---|---|---|
| 2004/0223449 | A1* | 11/2004 | Tsuie | H04L 27/2666 370/204 |
| 2008/0161035 | A1 | 7/2008 | Tomioka et al. | |
| 2009/0190837 | A1* | 7/2009 | Forutanpour | G06K 9/4609 382/203 |
| 2010/0023289 | A1* | 1/2010 | Miyazaki | G01R 29/02 702/69 |
| 2013/0147709 | A1* | 6/2013 | Kim | G06F 1/1694 345/158 |
| 2013/0163869 | A1* | 6/2013 | Chang | G06K 9/4604 382/170 |
| 2015/0093995 | A1* | 4/2015 | Gilbert | H04W 24/08 455/63.1 |
| 2016/0071264 | A1* | 3/2016 | Agam | G06K 9/3241 382/128 |
| 2016/0341770 | A1* | 11/2016 | Moline | H03K 5/082 |

FOREIGN PATENT DOCUMENTS

| | | |
|---|---|---|
| JP | 2001-027895 A | 1/2001 |
| JP | 2002-026825 A | 1/2002 |
| JP | 2005-523616 A | 8/2005 |
| JP | 2006-211241 A | 8/2006 |
| JP | 2008-167200 A | 7/2008 |
| JP | 2014-082610 A | 5/2014 |
| JP | 2016-040871 A | 3/2016 |
| JP | 2016-058841 A | 4/2016 |
| WO | WO-03/090037 A2 | 10/2003 |

* cited by examiner

| WIRELESS STANDARD | CENTER FREQUENCY | BANDWIDTH | ... | SHORTEST PACKET LENGTH |
|---|---|---|---|---|
| Reg#1 | fc1 | Df1 | ... | Lm1 |
| Reg#2 | fc2 | Df2 | ... | Lm2 |
| Reg#3 | fc3 | Df3 | ... | Lm3 |
| Reg#4 | fc4 | Df4 | ... | Lm4 |

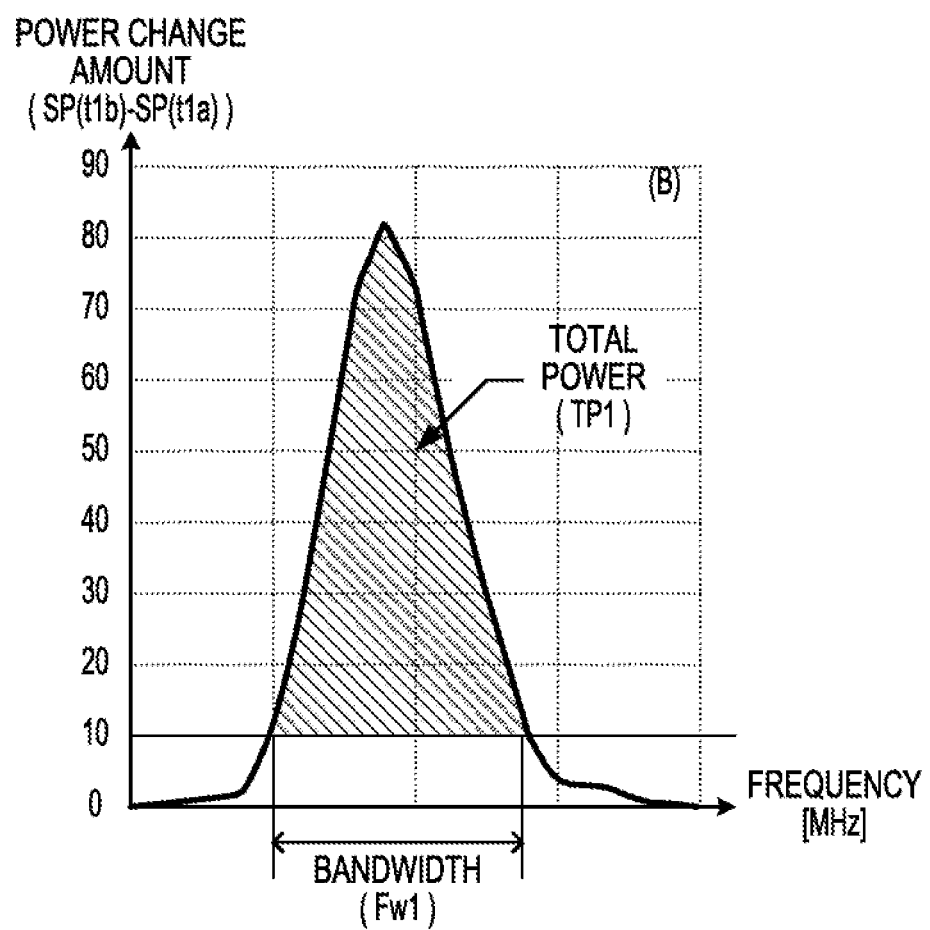

WIRELESS ANALYSIS DEVICE AND WIRELESS ANALYSIS METHOD

CROSS-REFERENCE TO RELATED APPLICATION

This application is a continuation application of International Application PCT/JP2017/046381 filed on Dec. 25, 2017 and designated the U.S., the entire contents of which are incorporated herein by reference. The International Application PCT/JP2017/046381 is based upon and claims the benefit of priority of the prior Japanese Patent Application No. 2017-002319, filed on Jan. 11, 2017, the entire contents of which are incorporated herein by reference.

FIELD

The embodiments discussed herein are related to a wireless analysis device and a wireless analysis method.

BACKGROUND

When performing a wireless communication, the presence of interfering radio waves is a factor that lowers the communication quality. Therefore, measures are taken to reduce the interference of radio waves by monitoring the interference conditions of radio waves. As for the measures that reduce the interference, there are, for example, a method of controlling the output of radio waves and a method of changing the installation location of equipment that outputs radio waves. Effective measures differ from each other according to the nature of interfering radio waves.

The nature of radio waves depends on the specifications defined in the wireless standards such as, for example, parameters used for modulation and control methods of radio waves. Therefore, when it is possible to discriminate the wireless standard of radio waves that travel through the air, it becomes easy to find measures that are effective for reducing the interference of radio waves. Further, examples of wireless standards include Bluetooth (registered trademark; hereinafter, "BT"), Bluetooth Low Energy (BLE), wireless local area network (WLAN), and ZigBee (registered trademark; hereinafter, "ZB").

As for a method of discriminating the wireless standards, there is, for example, a method of extracting the features of an incoming wave such as a center frequency of a signal, a bandwidth, a signal length, and a shape of a frequency spectrum from the power distribution of an incoming wave (the temporal transition of the frequency spectrum), and comparing such features with the features of the signal in each wireless standard.

In applying the above-described method, a process of detecting a signal component (a region where a signal exists on the power distribution) is performed from the power distribution of an incoming wave. Hereinafter, this process is called signal detection. The signal component may be represented by, for example, the rising time, the falling time, and the used bandwidth of the signal. As for a method of signal detection, for example, a method has been proposed in which a temporal change of a power value is measured for each frequency, and a portion where the power value is equal to or larger than a threshold value is detected as a signal component. When a single signal is included in the power distribution of the incoming wave, the signal components may be detected by applying this method.

In connection with the signal analysis technique, a technique has been proposed in which a signal is separated from the same signal source by identifying whether the signal is a frequency component from the same signal source by the fact whether at least one of the rising time and the falling time is common, and extracting/re-configuring the frequency component. In addition, a technique has been proposed in which the frequency characteristic of a signal included in a signal section is measured at high speed from a burst signal having a signal section and a no-signal section within a single signal period. Also, a technique of detecting a rising or a falling of a signal has been proposed with respect to a digital signal receiving device by determining whether a signal change is increasing or decreasing.

Related technologies are disclosed in, for example, Japanese National Patent Publication of International Patent Application No. 2005-523616 and Japanese Laid-open Patent Publication Nos. 2001-027895, 06-289072, and 06-326566.

SUMMARY

According to an aspect of the invention, a wireless analysis device includes a memory configured to store information on a frequency spectrum of an incoming wave and information on a plurality of edges including a rising edge and a falling edge of a signal included in the incoming wave, and a processor coupled to the memory and the processor configured to compare a power change amount of the frequency spectrum at a first edge of the plurality of edges with a first threshold value for each frequency, specify a frequency range in which the power change amount is larger than the first threshold value, set a second threshold value based on a sum of the power change amount within the frequency range, and specify a second edge in which a sum of powers in the frequency range changes over the second threshold value among the plurality of edges, the second edge having different directions of power change from the first edge.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of standard information;

FIGS. 10A and 10B are diagrams for explaining the generation of a difference spectrum and the calculation of a total power and bandwidth;

DESCRIPTION OF EMBODIMENTS

Figure 1:
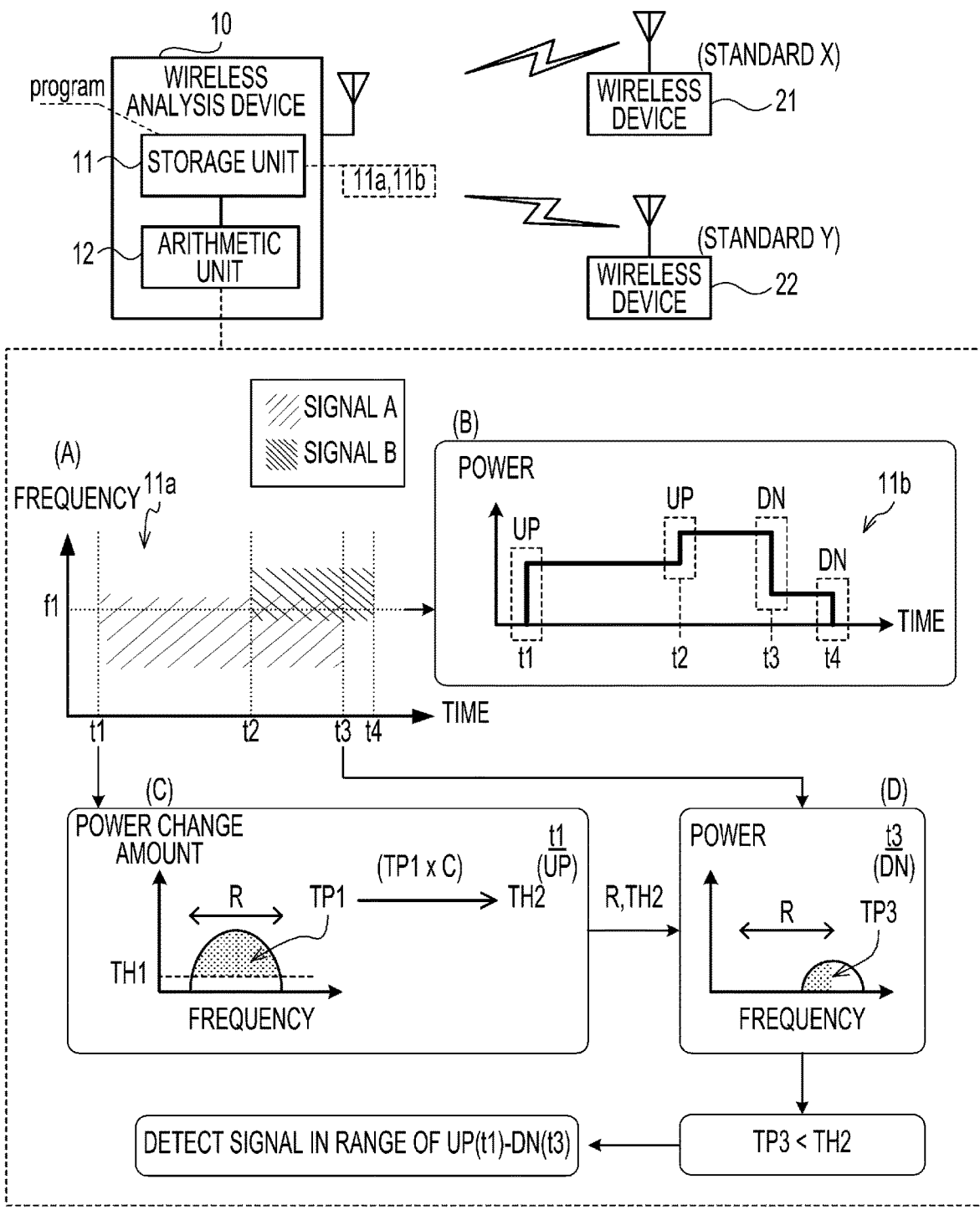
FIG. 1 is a diagram illustrating an example of a wireless analysis device according to a first embodiment.

In the above-proposed method of detecting a signal component by comparing a power value and a threshold value when a plurality of signals are mixed in the power distribution of the incoming wave and a plurality of signal components are superimposed, there is a risk that the signal components of the superimposed signals may not be separated. In contrast, when it is possible to detect the rising time and the falling time of the signal based on the temporal change of the power value and correlate the rising time and the falling time of each signal, the signal components of the superimposed signals may be separated.

Pairing the rising time with the falling time described above may be implemented by, for example, a process of comparing the features of signal components at both time points (feature comparison). However, when detecting the falling time corresponding to a certain rising time, a feature comparison is performed among all the falling times after the rising time in order to avoid a missed detection and an erroneous detection. Further, since the same process is executed for all the rising times, the processing load of the feature comparison is high and a relatively long time is required for the signal detection process.

Embodiments of a technology capable of shortening the time required for a signal detection process will be described below with reference to the accompanying drawings. In the present specification and drawings, elements having substantially the same functions are denoted by the same reference numerals, and redundant explanation thereof may be omitted.

First Embodiment

The first embodiment will be described with reference to FIG. 1. The first embodiment relates to a method of narrowing down the range for searching for a falling edge corresponding to a certain rising edge when detecting a signal component included in a power distribution of an incoming wave. FIG. 1 is a diagram illustrating an example of a wireless analysis device according to a first embodiment. The wireless analysis device 10 illustrated in FIG. 1 is an example of the wireless analysis device according to the first embodiment.

As illustrated in FIG. 1, the wireless analysis device 10 includes a storage unit 11 and an arithmetic unit 12. The storage unit 11 is a volatile storage device such as a random access memory (RAM), or a nonvolatile storage device such as a hard disk drive (HDD) or a flash memory. The arithmetic unit 12 is a processor (processor circuitry) such as a central processing unit (CPU), a digital signal processor (DSP), an application specific integrated circuit (ASIC), and a field programmable gate array (FPGA). The arithmetic unit 12 executes, for example, a program stored in the storage unit 11 or another memory.

FIG. 1 exemplifies the situation in which a signal transmitted from a wireless device 21 that transmits a signal corresponding to a certain wireless standard (standard X) and a signal transmitted from a wireless device 22 that transmits a signal corresponding to another wireless standard (standard Y) arrives at the wireless analysis device 10. Further, in the following description, for the convenience of explanation, a signal transmitted from the wireless device 21 is referred to as a signal A, and a signal transmitted from the wireless device 22 is referred to as a signal B. Also, the rising of a signal is referred to as UP and the falling of a signal is referred to as DN. Further, radio waves received by the wireless analysis device 10 may be referred to as incoming waves in some cases.

The storage unit 11 stores information 11a on the frequency spectrum of the incoming wave. For example, information indicating, for example, the power distribution (temporal change of frequency spectrum) of the incoming wave is stored in the storage unit 11 as the information 11a on the frequency spectrum. In the example of item (A) of FIG. 1, the hatched regions on the coordinate plane defined by a frequency axis and a time axis are described as the information 11a on the frequency spectrum of the incoming wave, and the signal components of the signals A and B are expressed.

In the example of item (A) of FIG. 1, the rising time of the signal A is t1 and the falling time thereof is t3. Further, the rising time of the signal B is t2, and the falling time thereof is t4. Since the signals A and B are superimposed, the temporal transition of the power amount at the frequency f1 is as illustrated in item (B) of FIG. 1. The rising times t1 and t2 and the falling times t3 and t4 are obtained from the temporal change of the power amount at each time point (a change in the power amount before and after each time point).

Information 11b on the edges of rising UP and falling DN of the signal included in the incoming waves is stored in the storage unit 11. For example, the storage unit 11 stores information indicating the rising time and the falling time for each frequency, such as the rising times t1 and t2 and the falling times t3 and t4, as information 11b on the edge. That is, in the storage unit 11, information on the rising time is stored as information on the rising UP edge and information on falling time is stored as information on the falling DN edge.

When the process of signal detection is started, the arithmetic unit 12 selects a first edge from the rising UP edge. In the example of FIG. 1, the edge at the rising time t1 is selected as the first edge.

For example, the arithmetic unit 12 selects a rising UP edge as a first edge in an order from the beginning of the incoming wave. Then, the arithmetic unit 12 compares the power change amount of the frequency spectrum at the first edge (e.g., the power change amount before and after the rising time t1) with a first threshold value TH1 (e.g., 10% of the peak power) for each frequency. In addition, the arithmetic unit 12 specifies a frequency range R in which the power change amount is larger than the first threshold value TH1.

As illustrated in item (C) of FIG. 1, the arithmetic unit 12 that specifies the frequency range R in which the power change amount is larger than the threshold value TH1 calculates the sum of the power change amounts TP1 in the frequency range R. Item (C) of FIG. 1 illustrates the power change amount at the rising time t1. Further, the arithmetic unit 12 sets a second threshold value TH2 based on the sum of the power change amounts TP1 in the frequency range R. For example, the arithmetic unit 12 sets the product of a preset margin C (C<1; e.g., 0.9) and the sum TP1 as the second threshold value TH2.

The arithmetic unit 12 that sets the second threshold value TH2 specifies the second edge which changes so that the sum of the power TP3 in the frequency range R among the edges having different directions of power change from the first edge changes over the second threshold value TH2. In the example of FIG. 1, the rising UP edge is selected as the first edge. In this case, the edge whose power change direction is different from that of the first edge becomes the falling DN edge.

In the example of FIG. 1, as illustrated in item (D) thereof, at the falling time t3, the sum of power TP3 in the frequency range R changes over the second threshold value TH2. That is, the sum TP3 of power changes to a value smaller than the second threshold value TH2 according to the change in the power amount at the falling time t3. Therefore, the arithmetic unit 12 specifies the falling edge DN at the falling time t3 as the second edge.

In this case, the arithmetic unit 12 performs a signal detection in the range between the edge (UP (t1)) at the rising time t1 which is the first edge and the edge (DN (t3)) at the falling time t3 as the second edge. That is, the arithmetic unit 12 detects the falling time corresponding to the rising time t1 between the rising time t1 and the falling time t3. For example, the arithmetic unit 12 detects the corresponding falling time by comparing the features such as the center frequency, the used bandwidth, the shape of the frequency spectrum, and the total power amount.

The sum of the power change amounts at the rising time corresponds to the increase amount of the power at the start point of the signal, and when the total sum of the power becomes smaller than the increased amount, the possibility that the end point of the same signal may exist after that time point is low. Therefore, even when the range for searching for the falling time is narrowed down to the time point when the total sum of the power becomes smaller, the risk of occurrence of signal detection failure is small.

Meanwhile, as the search range is narrowed down, the time required for the signal detection process becomes shortened. In the example of FIG. 1, the signal detection process for the falling time t4 may be omitted so that the processing load is reduced and the processing time is shortened.

The above descriptions have been made on the example in which the rising UP edge is selected as the first edge, but a modification in which the falling DN edge is selected as the first edge is also possible. For example, the falling DN edge is selected as the first edge in an order from the backward of the incoming wave, and the frequency range R is calculated with the power change amount (in this case, corresponding to the decrease amount of power before and after the edge) and the first threshold value TH1, and the second threshold value TH2 is set similarly as described above.

Further, the total sum of the power at the rising UP edge and the second threshold value TH2 are compared, and the edge at the time point when the total sum of the power changes over the second threshold value TH2 is specified as the second edge. In this case, the total sum of the power changes to a value larger than the second threshold value TH2 according to the change in the power amount at the rising time. Also, in the case where the falling DN edge is set as the first edge, the range between the first edge and the second edge is a target of signal detection. Such modification also falls within the technical scope of the first embodiment. The first embodiment has been described above.

Second Embodiment

Next, a second embodiment will be described. The second embodiment relates to a method of narrowing down a range for searching for a falling edge corresponding to a certain rising edge when detecting a signal component included in the power distribution of an incoming wave.

[2-1. System]

Figure 2:
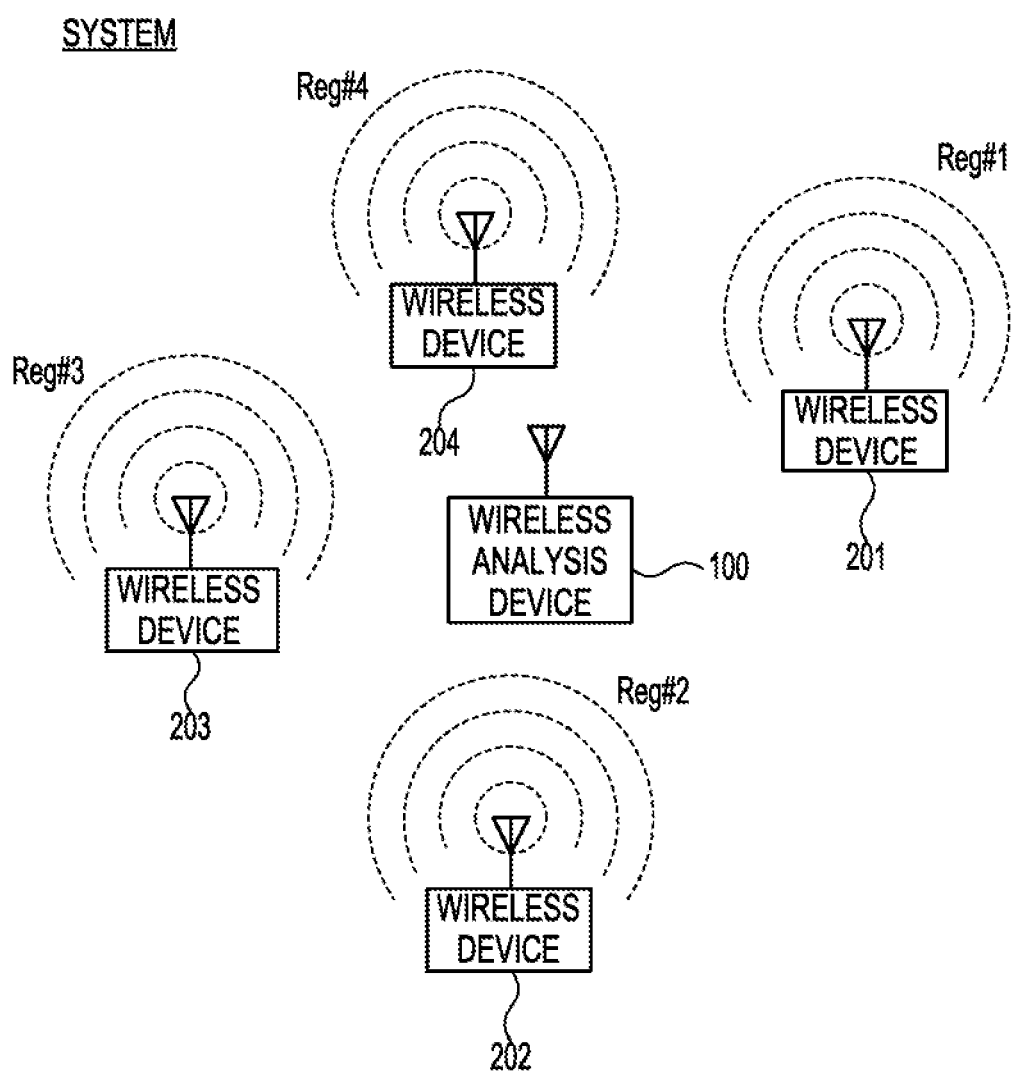
FIG. 2 is a diagram illustrating an example of a system according to a second embodiment.

A system according to the second embodiment will be described with reference to FIG. 2. FIG. 2 is a diagram illustrating an example of the system according to the second embodiment.

The system illustrated in FIG. 2 is an example, and for example, the number of wireless devices, the type of wireless standards, and the ranges of devices included as one wireless communication system may be modified. However, for the convenience of explanation, the following description will be made based on the system illustrated in FIG. 2 as an example.

The system illustrated in FIG. 2 includes a wireless analysis device 100 and wireless devices 201, 202, 203, and 204. The wireless analysis device 100 is a computer having an antenna that receives radio waves. The wireless devices 201, 202, 203, and 204 are, for example, a smartphone, a tablet terminal, a mobile phone, a wireless base station, a wireless relay station, a personal computer (PC), and a machine type communication (MTC) terminal. The wireless devices 201, 202, 203, and 204 correspond to the wireless standards Reg #1, #2, #3, and #4, respectively. Reg #1, #2, #3, and #4 are, for example, BT, BLE, ZB, and WLAN.

The wireless analysis device 100 receives radio waves output from at least one of the wireless devices 201, 202, 203, and 204, analyzes the received radio waves (incoming waves), and determines the wireless standards of the signals included in the incoming waves. As a method of determining the wireless standards, there is, for example, a method of extracting the features such as the center frequency of the signal, the bandwidth, the signal length, and the shape of the frequency spectrum from the power distribution of the incoming wave, and comparing such features with the features of the signal of each wireless standard. Also, for example, BT, BLE, WLAN, and ZB may be the subjects of the wireless standard.

The nature of radio waves depends on the specifications defined by the wireless standards such as parameters used for modulation and radio wave control methods. Therefore, when it is possible to discriminate the wireless standard of radio waves that travel through the air, it becomes easy to find measures that are effective for reducing the interference of radio waves. For example, it may contribute to improving the communication situation by controlling the output and changing the installation location of the equipment according to the wireless standard detected from an incoming wave.

[Flow of Signal Detection & Processing Load]

Figure 3:
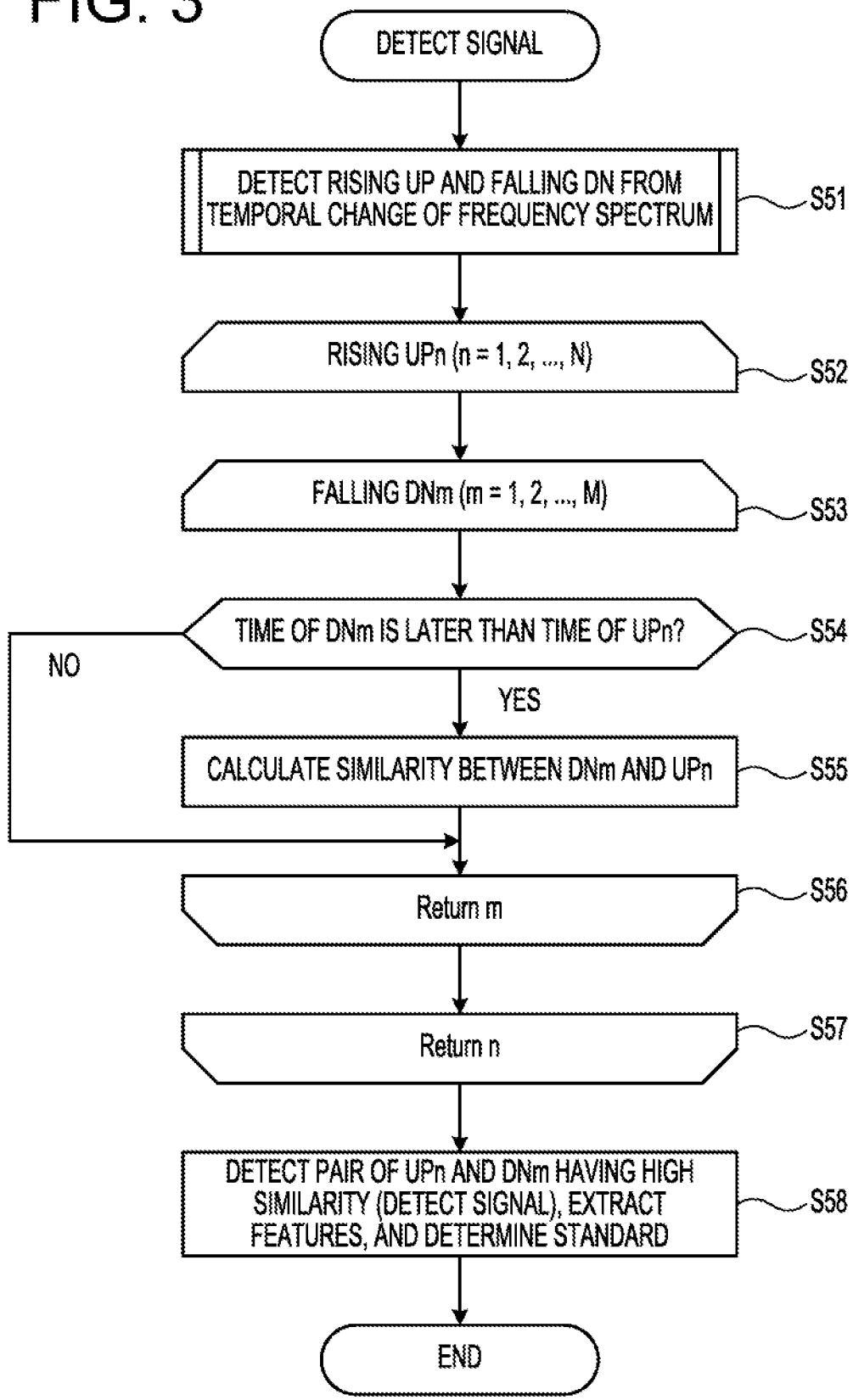
FIG. 3 is a flowchart illustrating a flow of process relating to a signal detection and determination of a wireless standard.
Figure 4:
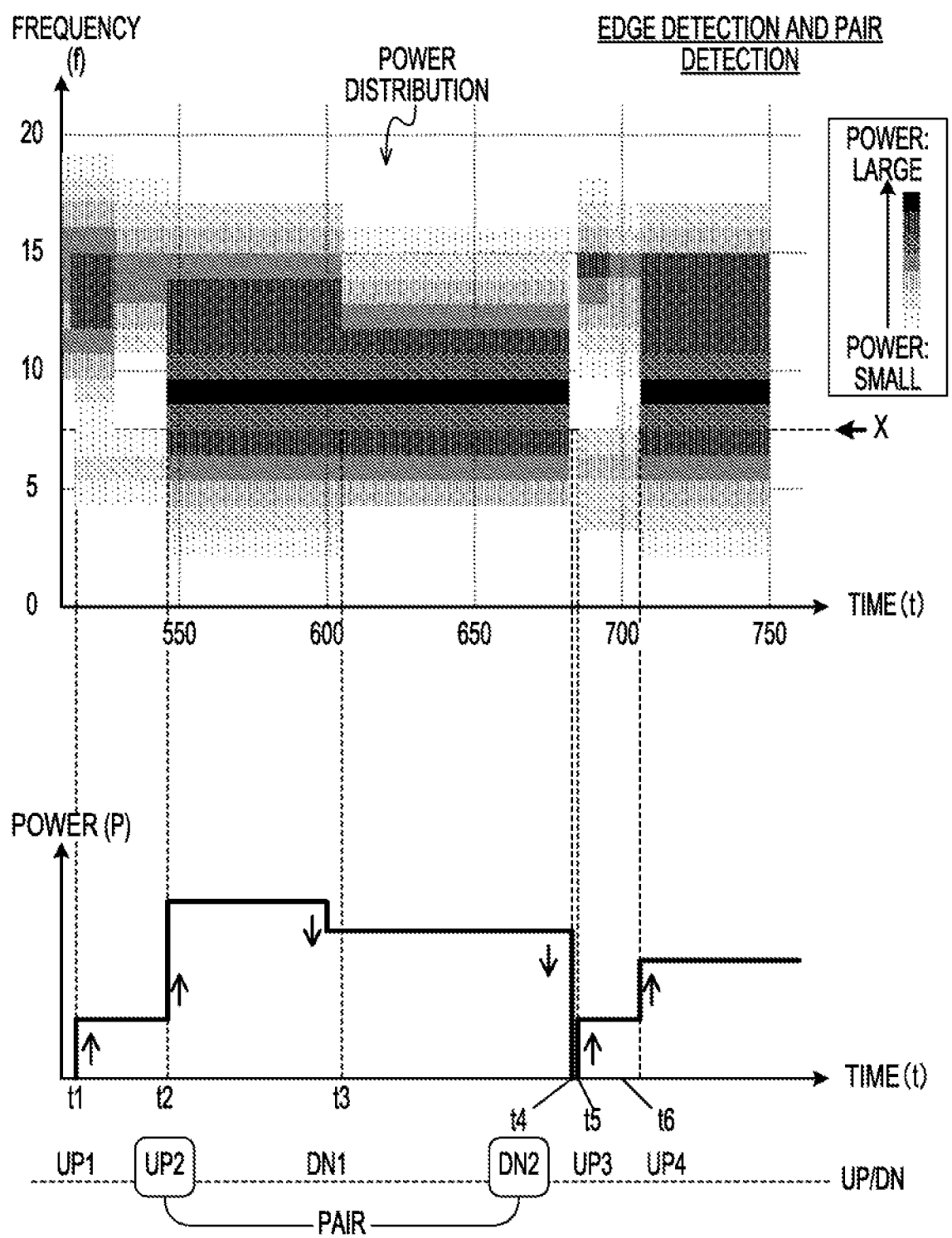
FIG. 4 is a diagram for explaining an edge detection and an edge pair extraction.

The above-described process relating to signal detection and determination of wireless standards is executed, for example, in accordance with a flow of process as illustrated in FIG. 3. FIG. 3 is a flowchart illustrating a flow of process relating to signal detection and determination of a wireless standard. FIG. 4 is also referred to as appropriate in the description. FIG. 4 is a diagram for explaining an edge detection and edge pair extraction.

(S51) The wireless analysis device 100 refers to the power distribution (temporal transition of the frequency spectrum) of the incoming wave and detects the rising UP and falling DN of the signal from the temporal change of the frequency spectrum at each time.

For the convenience of explanation, the phrase "temporal change of the frequency spectrum" may be used to express how the frequency spectrum has changed before and after a certain time. In the meantime, the information obtained by mapping the power of the incoming wave at each coordinate point on the time/frequency coordinate defined by the time axis and the frequency axis (refer to the power distribution in FIG. 4) may be referred to as "power distribution" or "temporal transition of the frequency spectrum" in some cases. That is, the cross section of the power distribution at a certain time corresponds to the frequency spectrum.

As for a method of detecting the rising UP and falling DN of the signal from the power distribution of the incoming wave, there is, for example, a method as illustrated in FIG. 4. In the case of employing the method of FIG. 4, the wireless analysis device 100 determines the increasing portion of the power P as the rising UP and the decreasing portion of the power P as the falling DN, based on the temporal change of the power P at each frequency.

Hereinafter, for the convenience of explanation, the time of the rising UP will be referred to as a rising time, and the time of the falling DN will be referred to as a falling time. In the example of FIG. 4, rising times t1, t2, t5, and t6 and falling times t3 and t4 are detected for a frequency X. However, at this time point, the correspondence relationship between the rising time and the falling time is not determined. A process after S52 is a process of associating a rising edge (corresponding to the beginning of the signal) and a falling edge (corresponding to the end of the signal) that belong to the same signal (edge pair search).

As an example, it is assumed that N risings UPn (n=1, 2, ..., N) and M fallings DNm (m=1, 2, ..., M) are detected in the process of S51.

(S52, S57) The wireless analysis device 100 repeatedly executes the process from S53 to S56 while increasing a parameter n by one. That is, the wireless analysis device 100 selects the rising UPn one by one, and executes a search process of the falling DN that belongs to the same signal as the selected rising UPn.

(S53, S56) The wireless analysis device 100 repeatedly executes the process from S54 to S55 while increasing a parameter m by one. That is, the wireless analysis device 100 selects candidates of fallings DNs (falling DNm) similar to the rising UPn one by one, and executes a determination process of determining whether the rising UPn and the falling DNm belong to the same signal.

(S54) The wireless analysis device 100 determines whether the time (falling time) of the falling DNm is later than the time (rising time) of the rising UPn. The rising time of a certain signal is located before the falling time of the signal. Therefore, when the time of the falling DNm is located before the time of the rising UPn, the rising UPn and the falling DNm are not paired. By executing this determination, it is possible to reduce the calculation load of S55 to be described later.

When the time of the falling DNm is later than the time of the rising UPn, the process proceeds to step S55. Meanwhile, when the time of the falling DNm is not later than the time of the rising UPn, the process proceeds to S56.

(S55) The wireless analysis device 100 calculates a similarity between the falling DNm and the rising UPn. As the degree of similarity, for example, a similarity based on a feature such as a waveform of the frequency spectrum, a center frequency, a used bandwidth, or total power may be used. The wireless analysis device 100 holds the calculated similarity between the falling DNm and the rising UPn.

(S58) The wireless analysis device 100 refers to the held similarity, detects a pair of falling DNm and rising UPn having the high similarity, and extracts a section between falling DNm and rising UPn. In addition, it is possible to specify (signal detection) the region (signal component) where the signal exists in the power distribution by extracting, from the extracted section, a bandwidth in which the power P is larger than the threshold value using a preset threshold value.

Further, the wireless analysis device 100 extracts the features such as, for example, the center frequency, the used bandwidth, the signal length, and the waveform of the frequency spectrum from signal components included in the power distribution (feature extraction), and compares such features with the features of the signal of each wireless standard to determine the wireless standard (standard determination). A method of determining the wireless standard by using the correlation between the preamble reference signal of each wireless standard and the waveform of the signal component may also be applied. When the process of S58 is completed, a series of processes illustrated in FIG. 3 are ended.

It becomes possible to detect the signal component from the power distribution of the incoming wave and determine the wireless standard from the characteristics of the detected signal component by applying the above-described method. However, in the flow of process exemplified in FIG. 3, since a large number of repetitive processes are caused by the double loop of S52, S53, S56, and S57, the processing load for signal detection increases in some cases. Therefore, the wireless analysis device 100 according to the second embodiment appropriately narrows down the range in which the falling DNm candidate exists, and performs the above similarity calculation on the falling DNm within the range. It becomes possible to shorten the time required for signal detection by introducing this mechanism.

Hereinafter, the wireless analysis device 100 according to the second embodiment will be described.

[2-2. Hardware]

Figure 5:
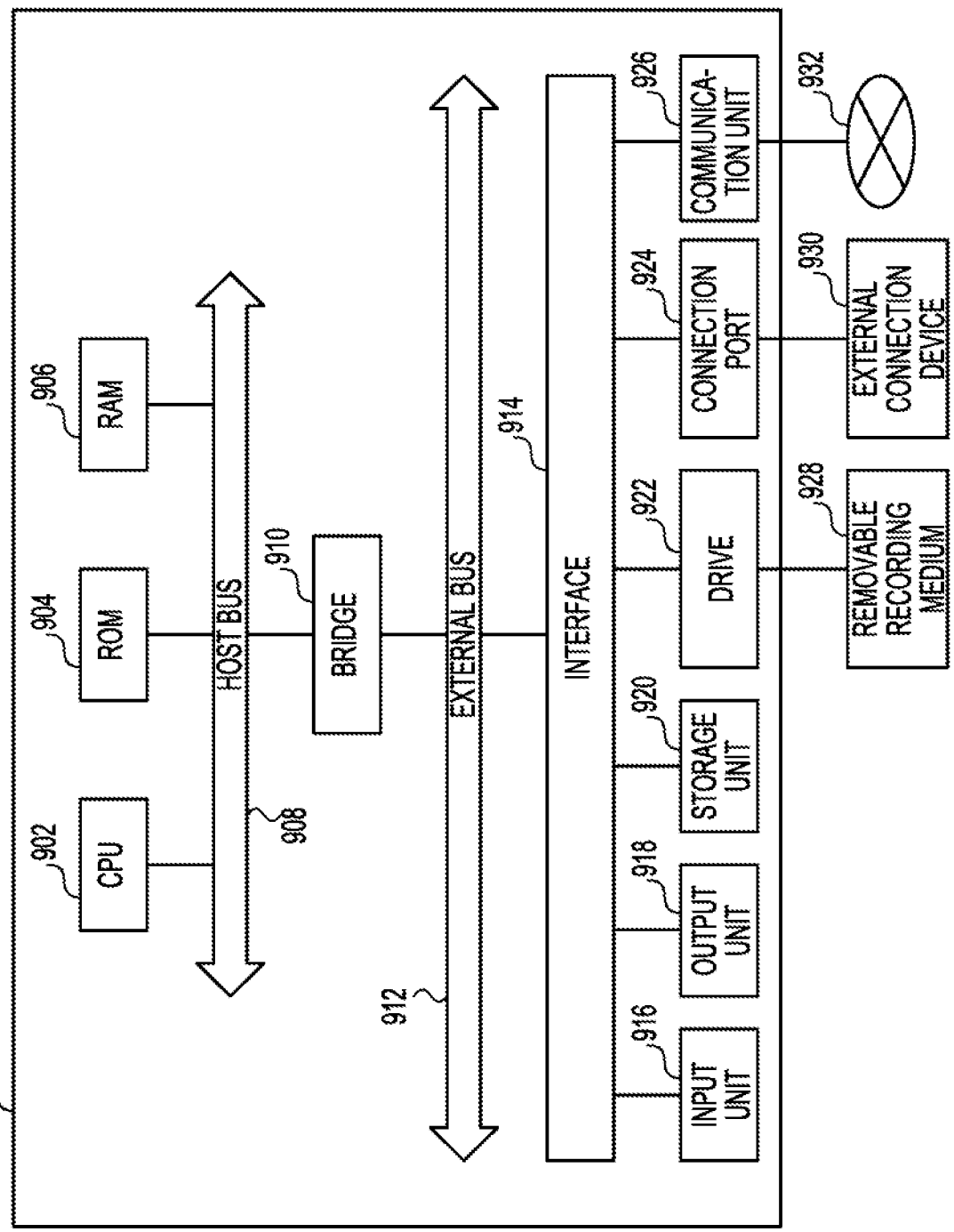
FIG. 5 is a block diagram illustrating an example of hardware capable of implementing the functions of a wireless analysis device according to the second embodiment.

The hardware capable of implementing the function of the wireless analysis device 100 will be described with reference to FIG. 5. FIG. 5 is a block diagram illustrating an example of hardware capable of implementing the functions of the wireless analysis device according to the second embodiment.

The functions of the wireless analysis device 100 may be implemented by using, for example, the hardware sources illustrated in FIG. 5. That is, the functions of the wireless analysis device 100 are implemented by controlling the hardware illustrated in FIG. 5 by using a computer program.

As illustrated in FIG. 5, the hardware mainly includes a CPU 902, a read only memory (ROM) 904, a RAM 906, a host bus 908, and a bridge 910. Further, the hardware includes an external bus 912, an interface 914, an input unit 916, an output unit 918, a storage unit 920, a drive 922, a connection port 924, and a communication unit 926.

The CPU 902 functions as, for example, an arithmetic processing device or a controller and controls the overall operation or a portion of an operation of each component based on various programs recorded in the ROM 904, the RAM 906, the storage unit 920, or a removable recording medium 928. The ROM 904 is an exemplary memory device that stores, for example, a program to be read by the CPU 902 or data used for an arithmetic operation. The RAM 906 temporarily or permanently stores, for example, a program to be read by the CPU 902 or various parameters which vary when the program is executed.

These components are connected to each other through, for example, the host bus 908 capable of transmitting data at a high speed. Meanwhile, the host bus 908 is connected to the external bus 912, which transmits data at a relatively low speed, through the bridge 910. As the input unit 916, for example, a mouse, a keyboard, a touch panel, a touch pad, a button, a switch, and a lever are used. Further, as the input unit 916, a remote controller may be used to be capable of transmitting a control signal through infrared rays or other radio waves.

As the output unit 918, a display device such as, for example, a cathode ray tube (CRT), a liquid crystal display (LCD), a plasma display panel (PDP), or an electro-luminescence display (ELD) may be used. Further, as the output unit 918, an audio output device such as a speaker or a headphone, or a printer may be used.

The storage unit 920 is a device that stores various data. As the storage unit 920, a magnetic memory device such as, for example, an HDD is used. Further, as the storage unit 920, a semiconductor memory device such as a solid state drive (SSD) or a RAM disk, an optical memory device, or an optical magnetic memory device may be used.

The drive 922 is a device that reads information recorded in the removable recording medium 928 or records information in the removable recording medium 928. As the removable recording medium 928, for example, a magnetic disk, an optical disk, a magneto-optical disk, or a semiconductor memory is used. Further, a program that defines the operation of the wireless analysis device 100 may be stored in the removable recording medium 928.

The connection port 924 is a port that connects an external connection device 930 such as a universal serial bus (USB) port, an IEEE 1394 port, a small computer system interface (SCSI), an RS-232C port, or an optical audio terminal. As the external connection device 930, for example, a printer is used.

The communication unit 926 is a communication device that connects to a network 932. As the communication unit 926, for example, a communication circuit for a wired or wireless LAN, a communication circuit for wireless USB (WUSB), or a communication circuit for a mobile phone network may be used. The network 932 is, for example, a network connected by wired or wireless connection. An antenna (not illustrated) that is usable to receive the incoming wave is connected to the communication unit 926, and the communication unit 926 may detect the power distribution of the incoming wave input via the antenna.

The hardware of the wireless analysis device 100 has been described above. Further, the hardware described above is only an example, and it is possible to omit a portion of elements or add a new element thereto. In addition, the functions of the wireless devices 201, 202, 203, and 204 may also be implemented by using a portion of all or a portion of the hardware illustrated in FIG. 5.

[2-3. Function of Wireless Analysis Device]

Figure 6:
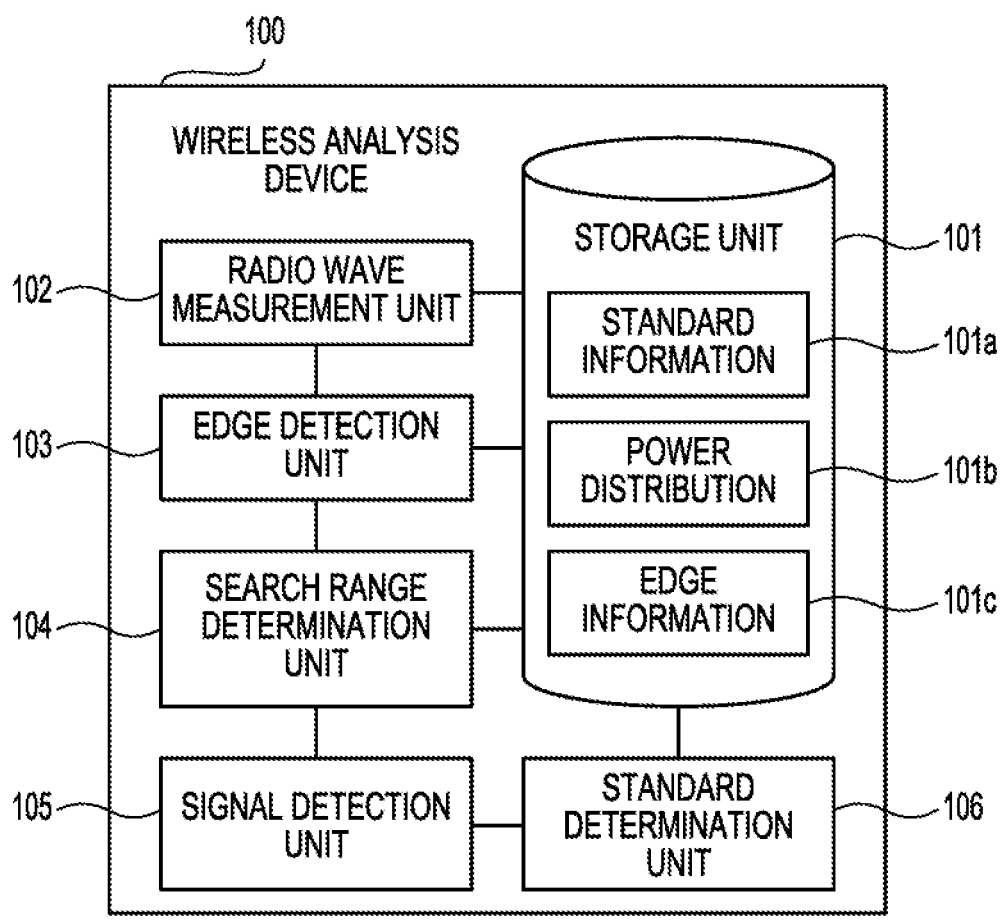
FIG. 6 is a block diagram illustrating an example of the functions of the wireless analysis device according to the second embodiment.

Subsequently, the function of the wireless analysis device 100 will be described with reference to FIG. 6. FIG. 6 is a block diagram illustrating an example of the function of the wireless analysis device according to the second embodiment.

As illustrated in FIG. 6, the wireless analysis device 100 includes a storage unit 101, a radio wave measurement unit 102, an edge detection unit 103, a search range determination unit 104, a signal detection unit 105, and a standard determination unit 106.

The function of the storage unit 101 may be implemented using, for example, the RAM 906 or the storage unit 920 described above. The function of the radio wave measurement unit 102 may be implemented using, for example, the above-described communication unit 926. The functions of the edge detection unit 103, the search range determination unit 104, the signal detection unit 105, and the standard determination unit 106 may be implemented using, for example, the above-described CPU 902.

Standard information 101a, information on power distribution 101b, and edge information 101c are stored in the storage unit 101.

The standard information 101a is information on the characteristics of signals defined for each wireless standard. For example, as illustrated in FIG. 7, the standard information 101a includes identification information that identifies a wireless standard, and information such as the center frequency of the signal, the bandwidth, and the shortest packet length defined by the wireless standard. FIG. 7 is a diagram illustrating an example of standard information. Further, the standard information 101a illustrated FIG. 7 is an example, and it is possible to omit a portion of the information or add the information.

Figure 8:
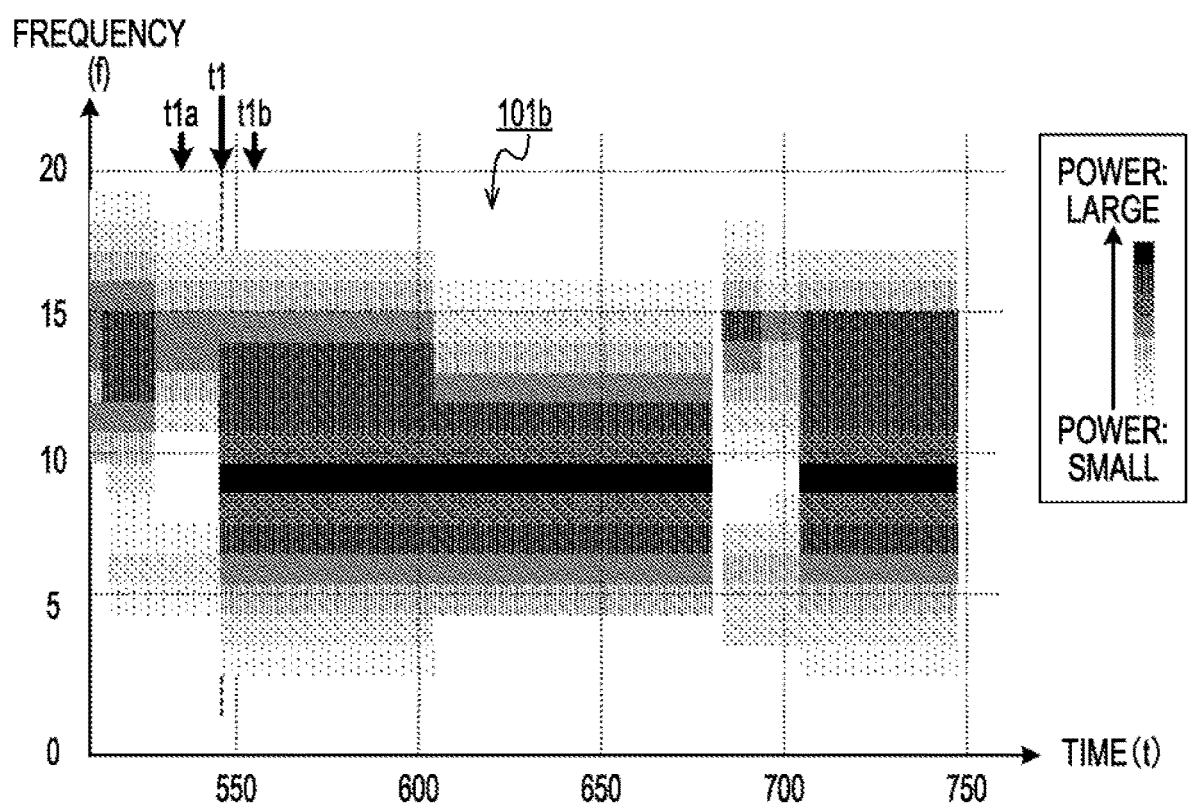
FIG. 8 is a diagram illustrating an example of power distribution.

The information on the power distribution 101b is information on the power distribution of the incoming wave. As illustrated FIG. 8, the power distribution 101b is information indicating the temporal change of the power value at each frequency. FIG. 8 is a diagram illustrating an example of power distribution. When such a power distribution 101b is obtained, it is possible to calculate, for example, the temporal change of the frequency spectrum at time t1. The temporal change of the frequency spectrum at time t1 is given by a difference between the frequency spectrum at time t1 and the frequency spectrum at time t1a before time t1.

Figure 9:
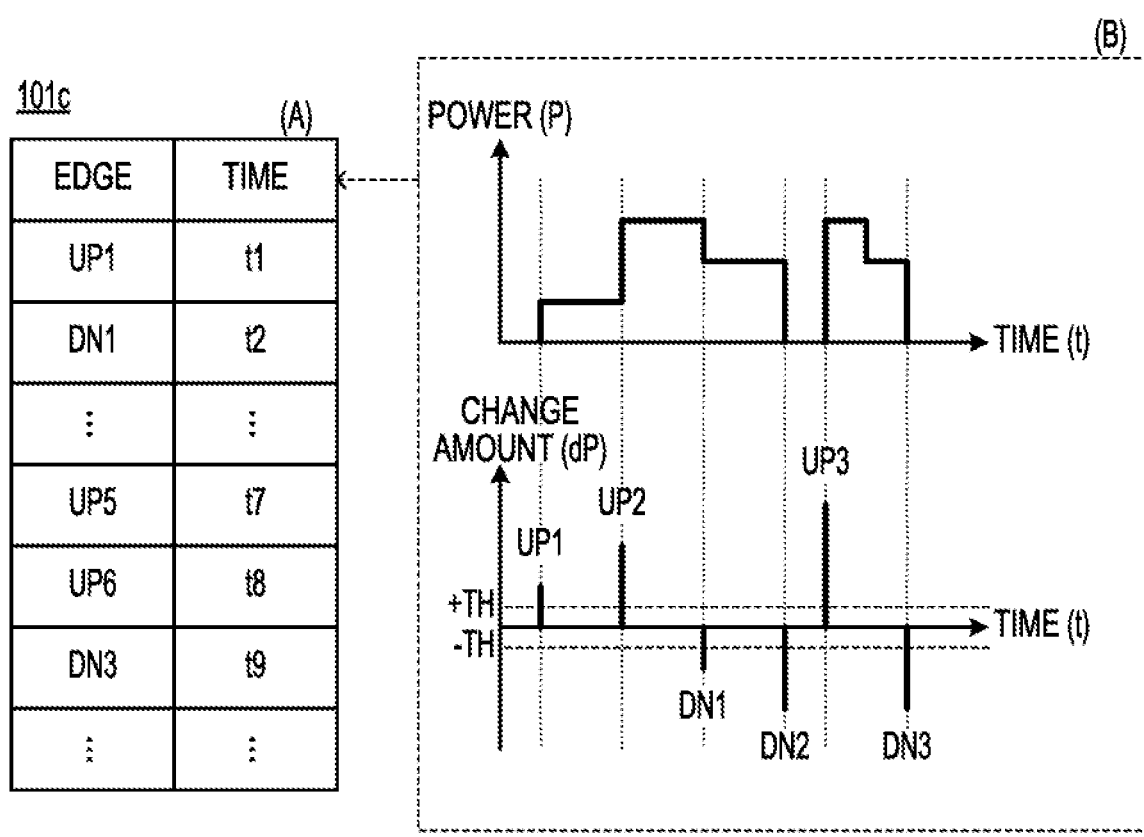
FIG. 9 is a diagram illustrating an example of edge information.

The edge information 101c is information on the edges of rising UP and falling DN detected from the power distribution 101b. As illustrated in item (A) of FIG. 9, the edge information 101c is information which associates identification information that identifies the rising UP and the falling DN (UPn, DNm; n=1, 2, . . . , N, m=1, 2, . . . , M) with the time (rising time, falling time). FIG. 9 is a diagram illustrating an example of edge information.

For example, as illustrated in item (B) of FIG. 9, the rising UP and the falling DN may be detected by obtaining the power change amount dP at each time from the temporal change of the power P at a certain frequency, and comparing dP with predetermined threshold values +TH and −TH. Further, TH is set to, for example, the minimum value of the detection signal power defined as specifications or 10% of the peak power. The rising UP and the falling DN may be detected even in a section where a plurality of signals are superimposed by using the change amount dP.

FIG. 6 is referred back to again. The radio wave measurement unit 102 measures the power P of the incoming wave for each frequency f and generates information on the power distribution 101*b* (see, e.g., FIG. 8). The edge detection unit 103 detects the rising UP and the falling DN from the power distribution 101*b*, and generates edge information 101*c* (see, e.g., FIG. 9). The search range determination unit 104 determines the search range when searching for the falling DN corresponding to the rising UP. A method of determining the search range will be described later.

The signal detection unit 105 detects the falling DN corresponding to the rising UP within the search range determined for each rising UP by the search range determination unit 104. That is, the signal detection unit 105 specifies a pair of rising UP and falling DN (see, e.g., UP2 and DN2 in FIG. 4).

A pair specification by the signal detection unit 105 is performed in the same flow as the process illustrated in FIG. 3, but is different from the example of FIG. 3 in that the range for searching for the falling DNm is restricted within the search range determined by the search range determination unit 104. This limitation may shorten the time required for the search. Also, the processing burden may be reduced.

In addition, the signal detection unit 105 extracts a bandwidth in which the power P is larger than a predetermined threshold value (e.g., 10% of the peak power) for each pair of the specified rising UP and falling DN. Then, the signal detection unit 105 specifies, as signal components, the section from the rising UP to the falling DN on the time axis and the range on the power distribution 101*b* surrounded by the extracted bandwidth. The standard determination unit 106 extracts the features of the signal component specified by the signal detection unit 105, compares such features with the features of the standard information 101*a*, and determines the wireless standard corresponding to the signal component.

The signal detection and standard determination by the wireless analysis device 100 are implemented with the above functions. In addition, since the range for searching for the falling DN is narrowed down at the time of signal detection, the time required for signal detection may be shortened. The processing burden associated with signal detection may also be reduced.

Figure 10A:
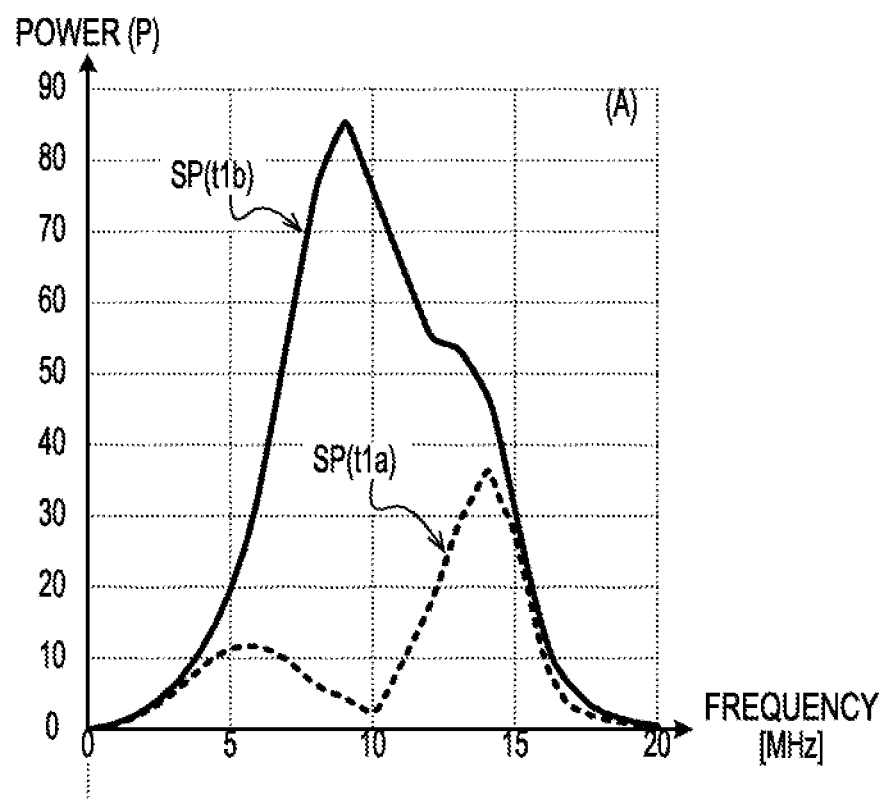

Here, the above-described search range determination method will be further described. As described above, the search range determination unit 104 determines the search range of the falling DN based on the power distribution 101*b* and the edge information 101*c*. For example, when determining the search range of the falling DN corresponding to the rising UP (see, e.g., FIG. 8) of the rising time t1, the search range determination unit 104 determines a difference spectrum from the frequency spectra of times t1*a* and t1*b*, as illustrated in FIGS. 10A and 10B. FIGS. 10A and 10B are diagrams for explaining generation of a difference spectrum and calculation of total power and bandwidth.

When the frequency spectrum of time t1*a* is expressed as SP(t1*a*) as illustrated in FIG. 10A, the difference spectrum is given by "SP(t1*b*)−SP(t1*a*)" (distribution of the power change amount) as illustrated in FIG. 10B. When the difference spectrum is obtained, the search range determination unit 104 specifies a bandwidth Fw1 corresponding to a portion in which the power change amount is larger than a predetermined threshold value (e.g., 10% of the peak value) in the difference spectrum. In addition, the search range determination unit 104 calculates the total of the power change amounts value (total power TP1) within the bandwidth Fw1.

The total power TP1 is the sum of the power change amounts at the rising time t1 and corresponds to the total power of the signal of the target rising UP. That is, when one target signal rises at time t1, even when the target signal overlaps with another signal, information on the power P of the target signal at a certain time and the waveform thereof (shape of the frequency spectrum) may be obtained by using the change in the power change amount.

Also, at the time when the target signal is present, the sum of the power P in the power distribution 101*b* (total power) does not become smaller than the total power TP1 obtained from the power change amount. In other words, there is a high possibility that the target signal may not be included in the power distribution 101*b* at the time when the total power in the power distribution 101*b* is smaller than the above total power TP1. When there is another signal in the power P, the total power in the power distribution 101*b* may become larger than the total power TP1 even when there is no target signal. Meanwhile, there is a low possibility that the falling DN of the target signal may exist after the time when the total power in the power distribution 101*b* becomes smaller than the total power TP1.

For the above-described reasons, the search range determination unit 104 sets the threshold value TH1 based on the total power TP1. For example, the search range determination unit 104 sets a value obtained by multiplying the total power TP1 by a predetermined coefficient C (C×TP1) as the threshold value TH1. A method of calculating the coefficient C will be described later.

Figure 11:
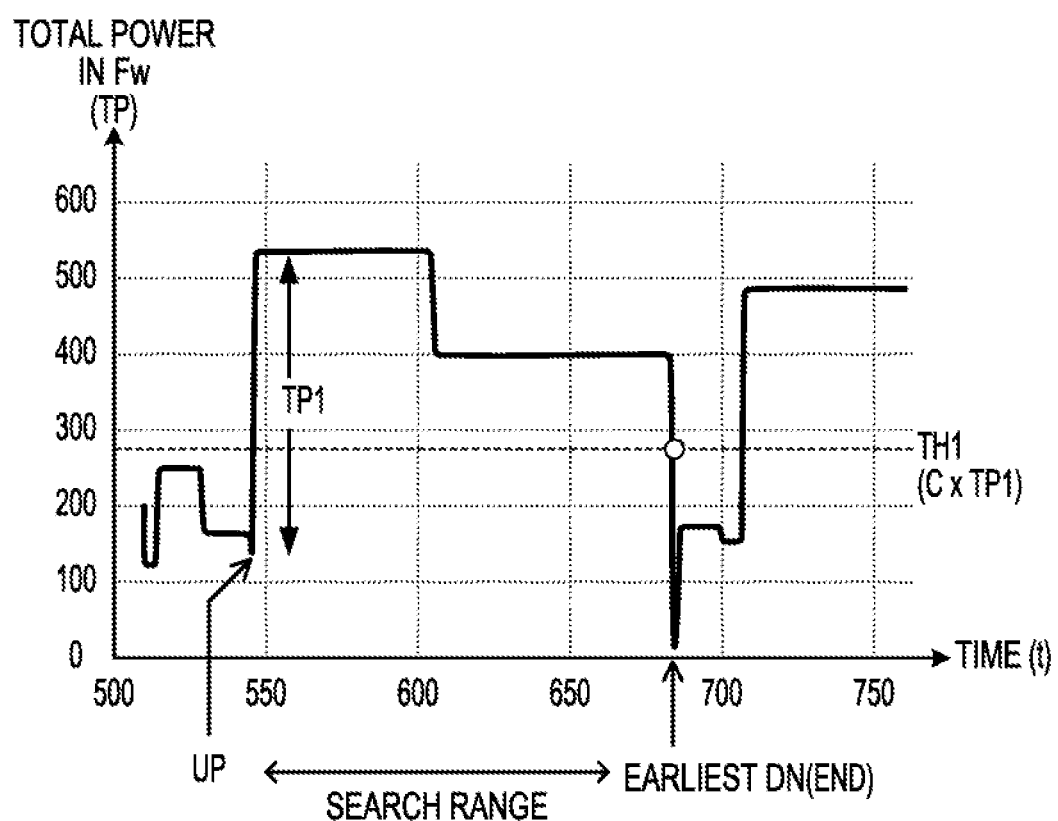
FIG. 11 is a diagram for explaining the setting of a threshold value and the determination of a search range.

Further, as illustrated in FIG. 11, the search range determination unit 104 obtains the total power within the bandwidth Fw1 in the power distribution 101*b* (total power TP within Fw), and after the rising time t1, the search range determination unit 104 detects the time at which the total power TP within the Fw becomes smaller than the threshold value TH1 (the latest falling time). Then, the search range determination unit 104 determines the range from the rising time t1 to the latest falling time, as the search range. FIG. 11 is a diagram for explaining setting of a threshold value and determination of a search range.

Here, a method of calculating the coefficient C will be described. The total power TP within Fw of the power distribution 101*b* changes according to the change in noise and bit pattern. Therefore, when the threshold value TH1 is used as the total power TP1, there is a risk that the total power TP within Fw becomes smaller than the threshold value TH1 before the falling DN of the target signal due to the influence of change of the noise and bit pattern. In order to avoid such a risk, the search range determination unit 104 multiplies the total power TP1 by a coefficient C less than 1 and uses the multiplication result as the threshold value TH1. The coefficient C may be set to a fixed value such as 0.9 or may be set to a suitable value by applying the tuning method described below.

As for a method of tuning the coefficient C, it is possible to apply, for example, a method of performing a signal detection using the power distribution 101*b* of the sample data after temporarily setting C to 0, and adjusting the coefficient C using the result of the signal detection by the search range determination unit 104. In this method, for each detected signal component, the search range determination unit 104 calculates the minimum value of the value obtained by dividing the total power TP in Fw by the sum of the power difference amounts at the rising time (corresponding to the total power TP1) in the range from the rising UP to the falling DN. Then, the search range determination unit 104 uses the calculated minimum value as the coefficient C.

That is, in the above-described method, the power distribution 101b of the sample data is used to statistically evaluate the change amount of the total power TP within Fw according to the change of noise and bit pattern, and the coefficient C is adjusted to a range where the risk of overlooking the falling DN is sufficiently suppressed in consideration of the change amount. As the coefficient C decreases, the risk of overlooking the falling DN (the risk that the falling DN of the detection object may be missing from the search range) decreases, but since the search range is expanded, the operation time for searching for the falling DN becomes longer. In the above-described method, since the statistical method is used, excessive reduction of the coefficient C is suppressed.

Descriptions will be made on the advantages obtained by narrowing down the above-described search range. As described above, it is possible to shorten the calculation time required for searching for the falling DN and to reduce the calculation load by narrowing down the search range. A calculation result is obtained that the search time may be reduced by about 80% in the result of a certain simulation while depending on the content of the power distribution 101b.

Figure 12:
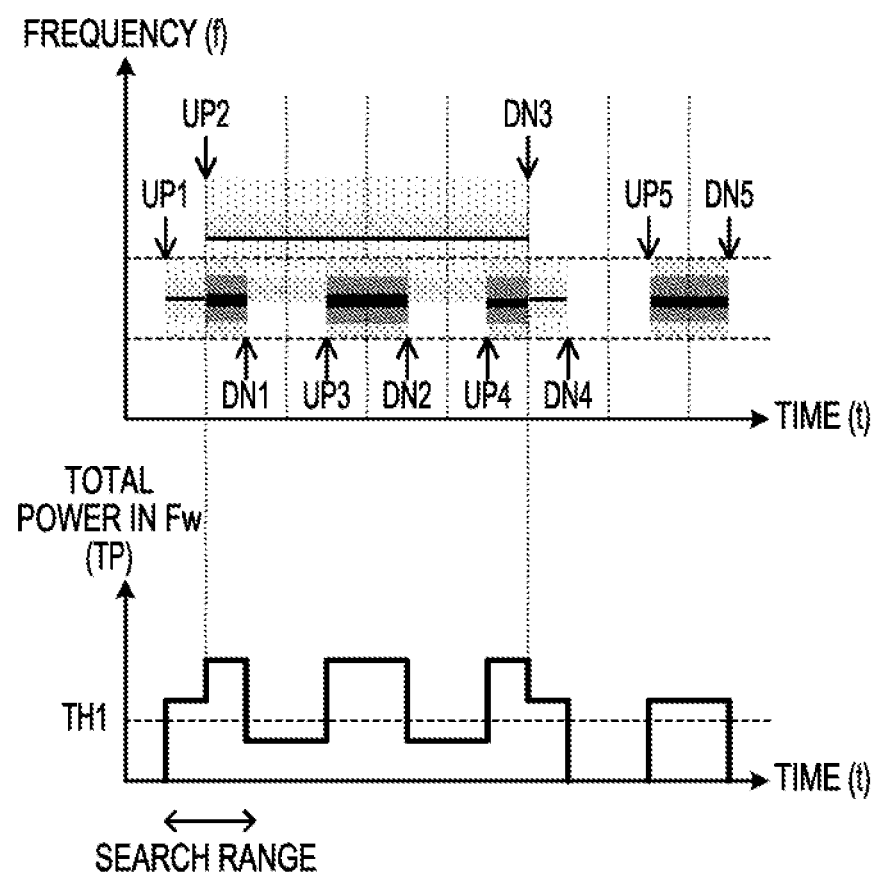
FIG. 12 is a diagram for explaining the advantages obtained by narrowing down a search range.

In addition to the above-described effects, even when the same signal is intermittently transmitted and superimposed with another signal having a large signal length (see, e.g., FIG. 12), it is possible to obtain the effect of shortening the calculation time and reducing the risk of erroneous detection by narrowing down the search range appropriately. FIG. 12 is a diagram for explaining advantages obtained by narrowing down a search range.

In the example of FIG. 12, rising UP 1, UP 2, . . . , UP 5 and falling DN1, DN 2, . . . , DN5 exist. {UP1, DN1}, {UP3, DN2}, {UP4, DN4}, {UP5, DN5} are pairs of rising UP and falling DN of the signal having, for example, the same protocol, channel, and power. In the case of such a pattern, the characteristics of the rising UP1 are similar to those of the falling DN1, DN2, DN4, and DN5. Therefore, the falling DN2, DN4, and DN5 may be erroneously detected as the falling DN corresponding to the rising UP1.

However, as the search range is narrowed down by comparing the total power TP within Fw with the above-mentioned threshold value TH1, the falling DN2, DN4, and DN5 which are missing from the search range in the example of FIG. 12 are not erroneously detected as the falling DN corresponding to the rising UP1. In this way, narrowing down the search range also contributes to reduction of erroneous detection risk.

Further, even when a small signal is superimposed on a large signal and a falling DN corresponding to the rising UP of a small signal is buried in noise of a large signal, there is also an advantage that a target value for the duration of a small signal is obtained by the latest falling time.

[Noise Reduction by Averaging]

Figure 13:
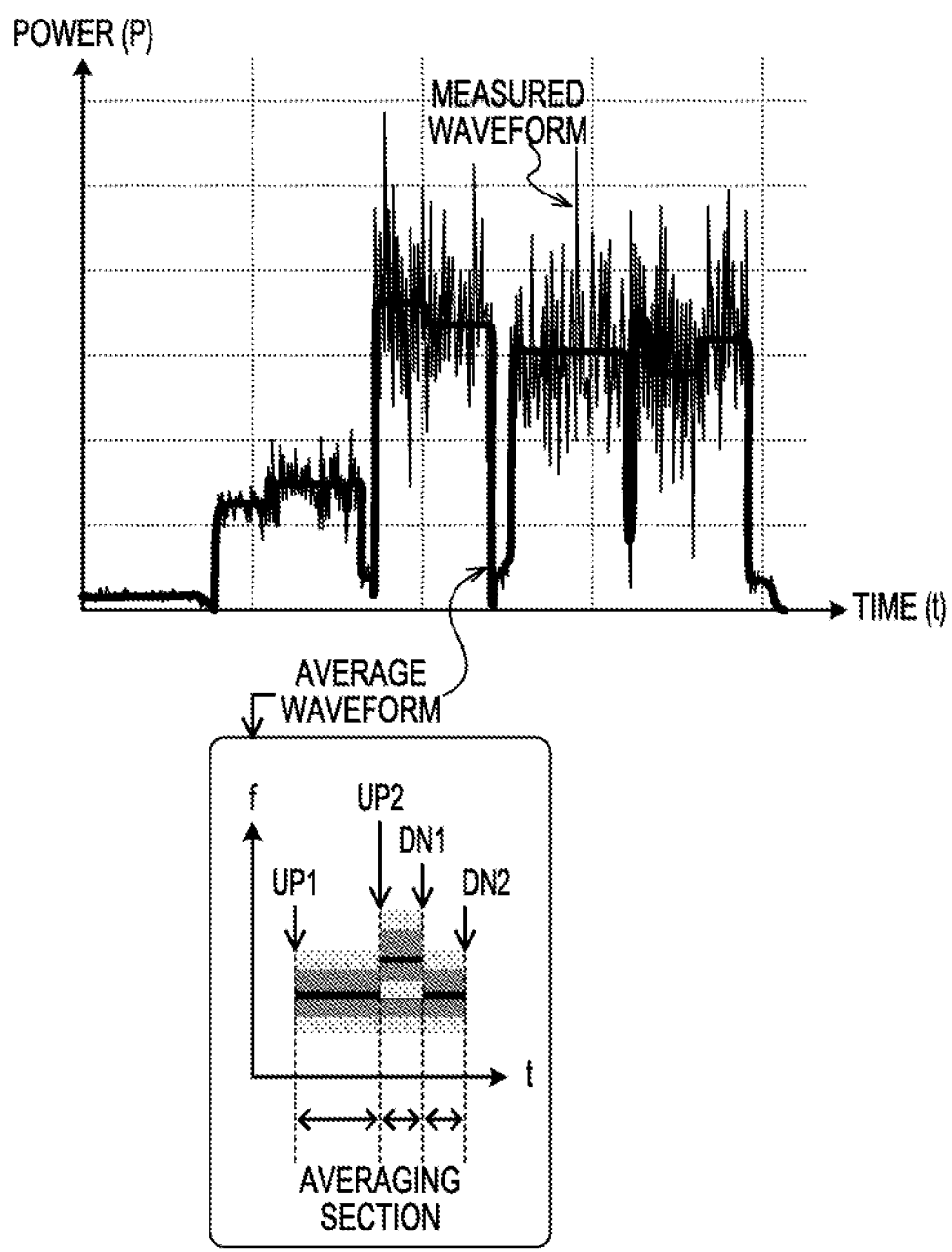
FIG. 13 is a diagram for explaining a noise reduction by averaging.

Meanwhile, the waveform of the power P measured by the radio wave measurement unit 102 (measured waveform) includes noise. When the noise is relatively large, there is a risk that the accuracy of signal detection deteriorates due to the influence of noise. In order to avoid such a risk, the radio wave measurement unit 102 averages the measured waveforms to suppress the influence of noise as illustrated in FIG. 13. FIG. 13 is a diagram for explaining noise reduction by averaging. The section to be averaged is a section from the rising UP to the falling DN immediately after the rising UP. By averaging the measured waveforms in such a section, it is possible to suppress the influence of noise on the accuracy of signal detection without impairing the information of the edge included in the measured waveforms. The functions of the wireless analysis device 100 have been described above.

[2-4. Flow of Process]

Figure 14:
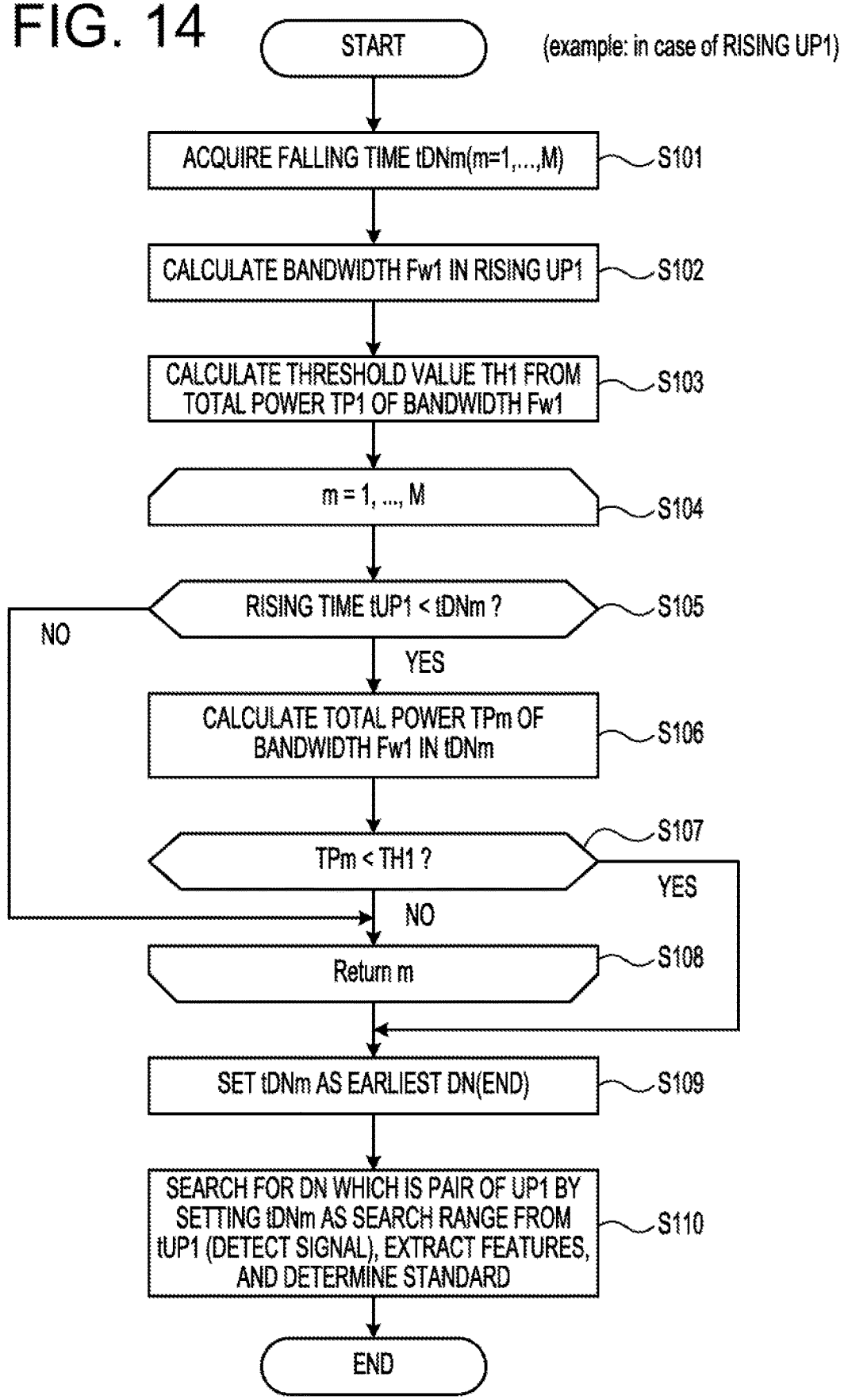
FIG. 14 is a flowchart illustrating the flow of process executed by the wireless analysis device according to the second embodiment.

Next, with reference to FIG. 14, a flow of process executed by the wireless analysis device 100 (e.g., a process from determination of a search range to standard determination) will be described. FIG. 14 is a flowchart illustrating the flow of process executed by the wireless analysis device according to the second embodiment.

The example of FIG. 14 represents detection of the falling DN paired with the rising UP1 at the time t1, and the process of determining the wireless standard from the detection result. It is assumed that the information of the power distribution 101b and the edge information 101c have already been obtained. Further, it is assumed that information on the falling DNm (m=1, . . . , M) is included in the edge information 101c. Hereinafter, the time of the falling DNm is expressed as tDNm, and the rising time of the rising UP1 is expressed as tUP1 (tUP1=t1).

(S101) The search range determination unit 104 refers to the edge information 101c and acquires the falling time tDNm (m=1, . . . , M). However, it is assumed that tDN1<tDN2< . . . <tDNm. Also, the process after S101 may be executed for tDNm at tUP1<tDN1.

(S102) The search range determination unit 104 calculates the bandwidth Fw1 at the rising UP1. For example, as illustrated in FIGS. 10A and 10B, the search range determination unit 104 generates a difference spectrum at the rising time tUP1, and obtains the bandwidth Fw1 corresponding to a portion where the power change amount is larger than a predetermined threshold value (e.g., 10% of the peak value).

(S103) As illustrated in FIGS. 10A and 10B, the search range determination unit 104 calculates the total power TP1 in the bandwidth Fw1 at the rising time tUP1. Then, the search range determination unit 104 calculates the threshold value TH1 from the calculated total power TP1. For example, the search range determination unit 104 multiplies the total power TP1 by the coefficient C obtained by the above-described tuning method, and sets the multiplication result (C×TP1) as the threshold value TH1.

(S104, S108) The search range determination unit 104 repeatedly executes the process from S105 to S107 while increasing the parameter m from 1 to M one by one. Since tDN1<tDN2< . . . <tDNm, the falling time tDNm is selected as the processing target in the time series order. When the process in the case where the parameter m is M has reached S108, the process proceeds to S109.

(S105) The search range determination unit 104 determines whether the rising time tUP1 is before the falling time tDNm (tUP1<tDNm). That is, the search range determination unit 104 determines whether the falling DNm is after the rising UP1. When tUP1<tDNm, the process proceeds to S106. Meanwhile, when tUP1<tDNm is not satisfied, the process proceeds to S108.

(S106) The search range determination unit 104 calculates the total power TPm (the total value of the power P) within the bandwidth Fw1 at the falling time tDNm by referring to the information of the power distribution 101b.

(S107) The search range determination unit 104 compares the total power TPm calculated in S106 with the threshold value TH1 calculated in S103, and determines whether the total power TPm is smaller than the threshold TH1 (Tpm<TH1). When TPm<TH1, the process proceeds to S109. Meanwhile, when TPm<TH1 is not satisfied, the process proceeds to S108. By this determination process, the falling time tDNm closest to the rising time tUP1 is selected from the falling times tDNm at which TPm<TH1.

(S109) The search range determination unit 104 sets the falling time tDNm to the latest falling time (END) (see, e.g., FIG. 11).

(S110) The search range determination unit 104 determines the section from the rising time tUP1 to the falling time tDNm, as the search range.

The signal detection unit 105 calculates the similarity between the rising UP1 and the falling DNm within the search range determined by the search range determination unit 104. As the similarity, for example, a similarity based on the features such as the waveform of the frequency spectrum, the center frequency, the used bandwidth, and the total power may be used. Then, the signal detection unit 105 specifies the falling DNm having the highest similarity, and determines the section from the rising time tUP1 to the falling time tDNm as a signal section.

The standard determination unit 106 recognizes the region of the power distribution 101b surrounded by the bandwidth Fw1 and the above signal section as a signal component, and extracts, from the signal component, features such as, for example, the center frequency, the used bandwidth, the signal length, and the waveform of the frequency spectrum. Further, the standard determination unit 106 compares the extracted features with the features of the signal of each wireless standards to determine the wireless standard. The standard determination unit 106 may determine the wireless standard by using a correlation between the preamble reference signal of each wireless standard and the waveform of the signal component.

When the process of S106 is completed, a series of processes illustrated in FIG. 14 are ended. The flow of process by the wireless analysis device 100 has been described above.

[2-5. Modification]

Next, a modification of the second embodiment will be described.

[Modification #1: Search of Earliest UP]

Figure 15:
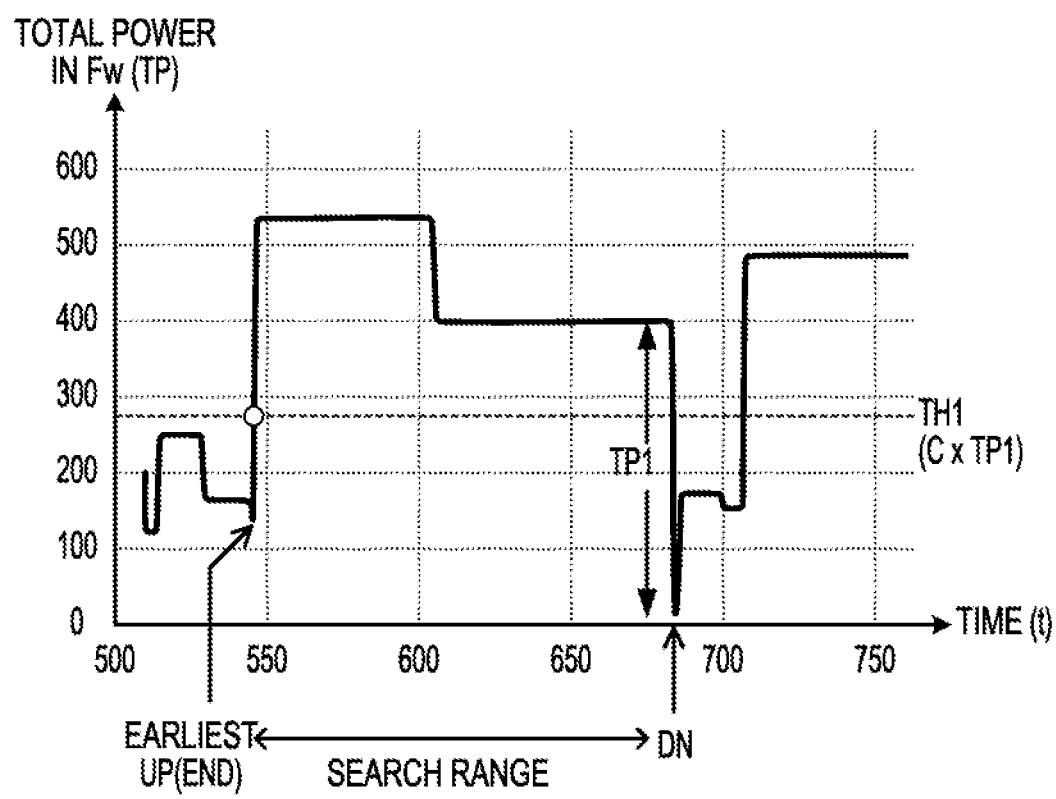
FIG. 15 is a diagram for describing a modification of the second embodiment (modification #1)

Descriptions have been made on a method of detecting a signal component from the power distribution 101b by searching for a falling DN corresponding to the rising UP. Here, a modification in which a signal component is detected from the power distribution 101b by searching for the rising UP corresponding to the falling DN (modification #1) will be described with reference to FIG. 15. FIG. 15 is a diagram for describing a modification of the second embodiment (modification #1).

In the case of modification #1, as illustrated in FIG. 15, the search range determination unit 104 generates a difference spectrum at the falling time tDN, and calculates a bandwidth Fw1 of a portion in which the power change amount (absolute value) is larger than a threshold value (e.g., 10% of the peak value). Further, the search range determination unit 104 calculates the threshold value TH1 (C×TP1) from the total power TP1 in the bandwidth Fw1. In addition, the search range determination unit 104 traces the time series in reverse, and detects the latest rising UP in which the total power TP in the Fw becomes smaller than the threshold value TH1. Then, the search range determination unit 104 determines the section between the falling time tDN and the rising time tUP (earliest rising time) of the detected rising UP, as the search range.

As described above, it is possible to implement a mechanism of searching for a rising UP corresponding to a falling DN by adding a modification to a mechanism of exchanging the rising UP and the falling DN and a process of tracing the time series in reverse. Modification #1 has been described above.

[Modification #2: Determination by Bandwidth Unoccupancy Ratio]

Figure 16:
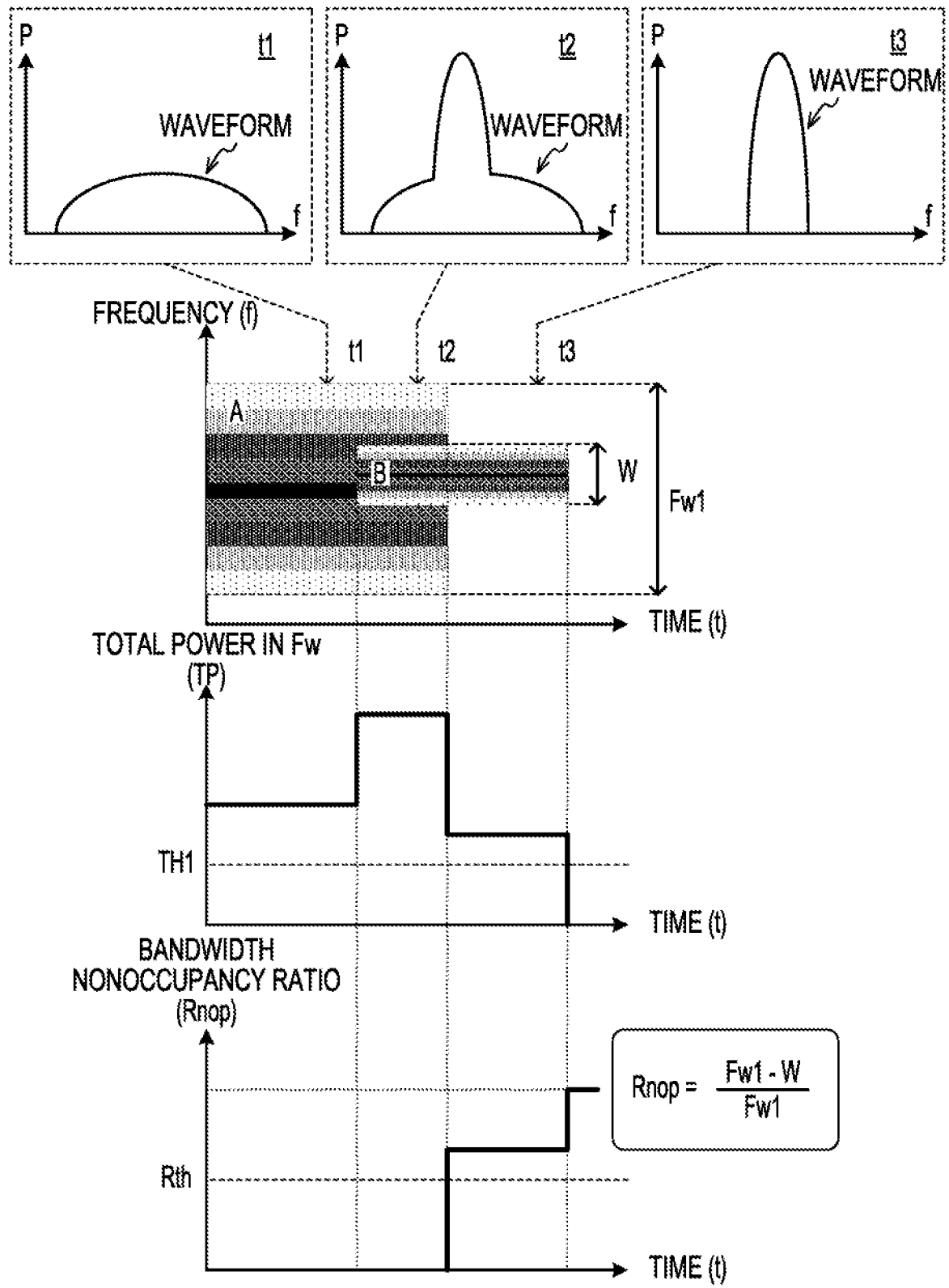
FIG. 16 is a diagram for describing a modification of the second embodiment (modification #2)

Next, as for another modification (modification #2), when detecting the latest falling time, a mechanism is introduced that considers the shape (waveform) of the frequency spectrum in addition to the total power TP in Fw. Hereinafter, this mechanism will be described with reference to FIG. 16. FIG. 16 is a diagram for describing a modification of the second embodiment (modification #2).

FIG. 16 illustrates the shape (waveform) of the frequency spectrum, the power distribution, the transition of the total power TP within Fw, and the transition of the bandwidth unoccupancy ratio Rnop at times t1, t2, and t3. In the power distribution exemplified in FIG. 16, a situation is represented in which a signal having a small peak power and a wide used bandwidth (signal A) and a signal having a large peak power and a narrow used bandwidth (signal B) are overlapped with each other. The waveform at time t1 is the waveform of signal A. The waveform at time t2 is the waveform of a portion where signals A and B are overlapped with each other. The waveform at time t3 is the waveform of signal B.

When searching for the latest falling time using the bandwidth Fw1 at the rising UP of the signal A and the threshold value TH1 based on the total power TP1 in the bandwidth Fw1, since the total power TP within the Fw of the signal B is large, the falling time of the signal B may be detected as the latest falling time. In such a situation, the search range becomes large. Therefore, in modification #2, a mechanism of further narrowing down the search range is introduced by considering the waveform using the ratio of a region in which the power for each frequency is smaller than a predetermined threshold value (e.g., 10% of the peak value or the noise floor) to the bandwidth Fw1 (band unoccupancy ratio Rnop).

For example, when the used bandwidth of the signal B is W, the bandwidth unoccupancy ratio Rnop is given by the following equation (1). The search range determination unit 104 determines a falling time in which the bandwidth unoccupancy ratio Rnop becomes larger than a predetermined threshold value Rth (e.g., 0.5) in the search range obtained by comparing the total power TP within the Fw with the threshold value TH1. Then, the search range determination unit 104 adjusts the search range so that the detected falling time becomes the latest falling time. By performing such adjustment, the search range may be appropriately determined in the situation illustrated in FIG. 16 as well. Modification #2 has been described above.

$$Rnop = \frac{Fw1 - W}{Fw1} \qquad (1)$$

[Modification #3: Determination by Shortest Packet Length]

Figure 17:
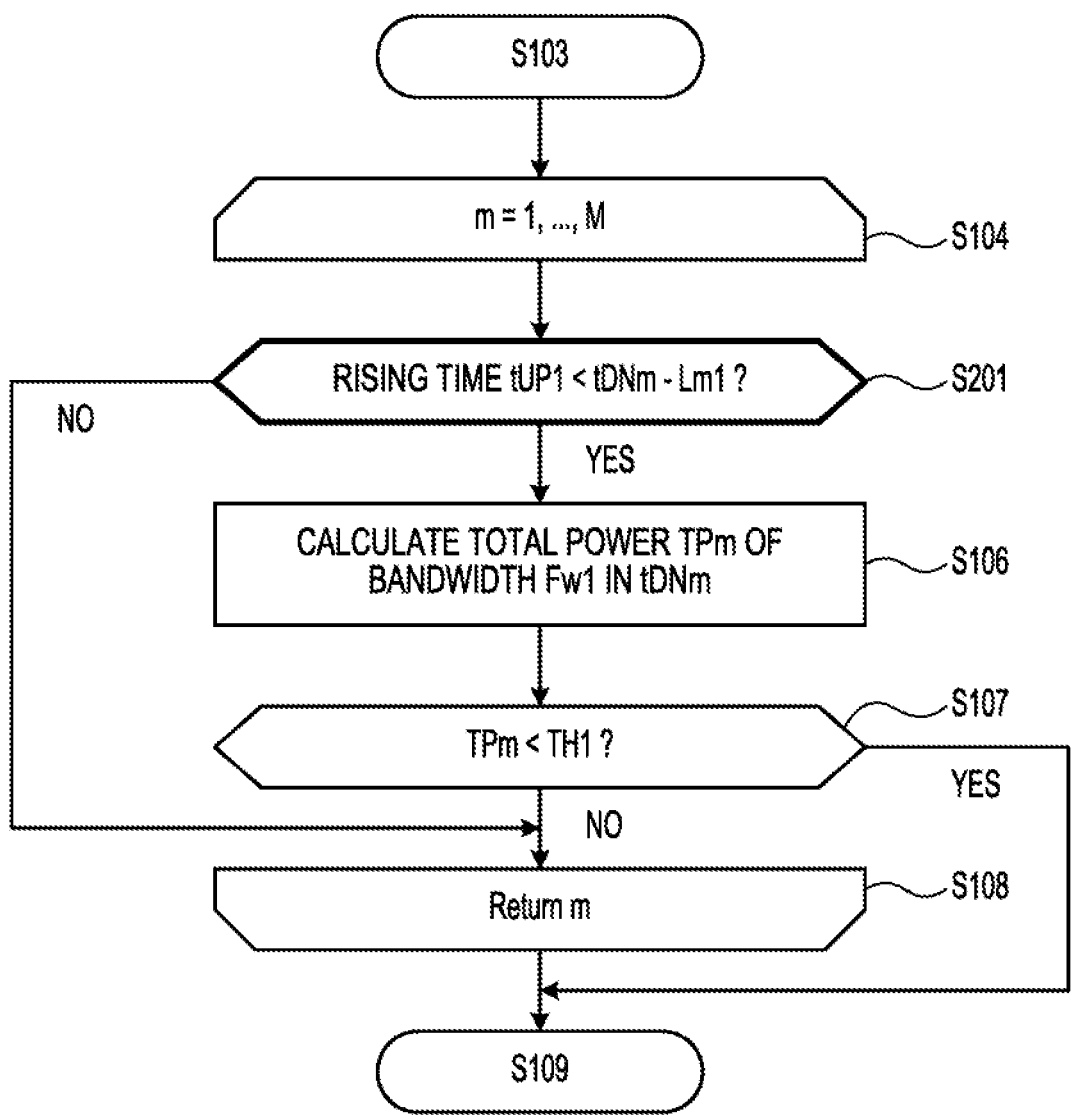
FIG. 17 is a diagram for describing a modification of the second embodiment (modification #3).

Next, as for another modification (modification #3), a mechanism is introduced to further narrow down the search range using the shortest packet length defined by the wireless standard to be determined. Hereinafter, this mechanism will be described with reference to FIG. 17. FIG. 17 is a diagram for describing a modification of the second embodiment (modification #3).

When the above-described mechanism is applied, the flow of process illustrated in FIG. 14 is modified as illustrated in FIG. 17. In order to avoid redundant explanation, the modified portion will be described.

(S201) After S104, the search range determination unit 104 compares the rising time tUP1 with (tDNm−Lm1). However, Lm1 is an example of the shortest packet length among the shortest packet lengths defined by the wireless standard to be determined. When tUP1<tDNm−Lm1, the process proceeds to S106. Meanwhile, when tUP1<tDNm−Lm 1 is not satisfied, the process proceeds to S108.

The above determination process is a process of excluding a falling time tDNm that has a time interval with the rising time tUP shorter than the shortest packet length from falling times tDNm. It becomes possible to further narrow down the search range, which contributes to shortening the calculation time by excluding the falling time tDNm in which the time interval is shorter than the shortest packet length. Further, since the falling DN which does clearly correspond to the rising UP is excluded from the search range, the risk of erroneous detection which may occur at the time of searching may be reduced. Modification #3 has been described above.

[Modification #4: Calculation Method of Threshold Value TH1]

Descriptions have been made on a method of using the product of the coefficient C and the total power TP1 as the threshold value TH1. Here, a mechanism of calculating the threshold value TH1 based on the following equation (2) is introduced. However, THmin is the product of the noise level and Fw1 for each frequency. Further, THmin may be determined in advance by, for example, simulation from the characteristics of a receiver. When the total power TP1 is small, the threshold TH1 becomes smaller than the noise level depending on the value of the coefficient C, and there is a risk that the search range may become large. When this mechanism is applied, since the threshold value TH1 is maintained in a range larger than the noise level, such risk may be reduced.

$$TH1 = \max\{C \times TP1, THmin\} \quad (2)$$

As for another method of calculating the threshold value TH1, a method of subtracting a predetermined value Q from the total power TP1 and using the subtraction result (TP1−Q) as the threshold value TH1 may be applied. The predetermined value Q is a value determined from the average power for each protocol (e.g., half of the average power). The protocol may be predicted from Fw1. For example, it is possible to predict that when Fw1 is less than 2 MHz, the protocol is BT, and when Fw1 is 8 MHz or more, the protocol is Wi-Fi or the like. Modification #4 has been described above.

As described above, the method of determining the search range according to the second embodiment may be variously modified. The above-described modification is an example, and a combination of the above-described modifications naturally belongs to the technical scope of the second embodiment. In the above explanation, for the convenience of explanation, descriptions have been made on an example in which the wireless analysis device 100 separate from the wireless device 201 executes processes such as signal detection and standard determination, but the function of the wireless analysis device 100 may be mounted on the wireless device 201. Such a modification also falls within the technical scope of the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless analysis device comprising:
   a memory configured to store information on a frequency spectrum of an incoming wave and information on a plurality of edges including a rising edge and a falling edge of a signal included in the incoming wave, the information on the plurality of edges including information on a rising time as information on the rising edge and information on a falling time as information on the falling edge; and
   a processor coupled to the memory and the processor configured to:
   compare a power change amount of the frequency spectrum at a first edge of the plurality of edges with a first threshold value for each frequency;
   specify a frequency range in which the power change amount is larger than the first threshold value;
   set a second threshold value to a value obtained by multiplying a sum of power change amounts within the frequency range at a time of the first edge included in the information on the plurality of edges by a coefficient less than 1, the power change amounts corresponding to frequencies included in the frequency range, respectively; and
   specify a second edge in which a sum of powers in the frequency range changes over the second threshold value among the plurality of edges, the second edge having different directions of power change from the first edge.

2. The wireless analysis device according to claim 1, wherein the processor is configured to:
   extract the second edge closest to the first edge; and
   detect a region where a signal exists on a power distribution of the incoming wave with respect to a section between the first edge and the second edge.

3. The wireless analysis device according to claim 1, wherein, when the first edge is the rising edge, the processor is configured to specify, as the second edge, an edge whose the sum of powers is smaller than the second threshold value among falling edges after the first edge.

4. The wireless analysis device according to claim 1, wherein, when the first edge is the falling edge, the processor is configured to specify, as the second edge, an edge whose the sum of powers is larger than the second threshold value among rising edges before the first edge.

5. The wireless analysis device according to claim 1, wherein, when specifying the second edge, the processor is configured to:
   detect a portion of the frequency range in which a power for each frequency is smaller than a third threshold value within the frequency range;
   detect an edge whose ratio of the detected portion of the frequency range to the frequency range is larger than a fourth threshold value; and
   adjust the frequency range so that the detected edge becomes the second edge.

6. The wireless analysis device according to claim 1, wherein information on a shortest packet length corresponding to a predetermined wireless standard is stored in the memory, and
wherein, when specifying the second edge, the processor is configured to exclude an edge whose interval between the first edge and the second edge is smaller than the shortest packet length from candidates of the second edge.

7. The wireless analysis device according to claim 1, wherein the processor is configured to:
select a minimum value of values obtained by dividing the sum of the power change amount within the frequency range by a sum of power difference amounts at a time of the first edge, as the coefficient; and
set the second threshold value by multiplying the sum of the power change amount within the frequency range by the coefficient.

8. The wireless analysis device according to claim 7, wherein the processor is configured to:
calculate a minimum threshold value by multiplying a noise level by the sum of the power change amount within the frequency range for each frequency; and
select a larger value between a value obtained by multiplying the sum of the power change amount within the frequency range by the coefficient, and the minimum threshold value, as the first threshold value.

9. The wireless analysis device according to claim 1, wherein the processor is configured to:
calculate the first threshold value by subtracting a value determined from an average power for each protocol that corresponds to the incoming wave from the sum of the power change amount within the frequency range for each frequency.

10. A wireless analysis method comprising:
reading information on a frequency spectrum of an incoming wave and information on a plurality of edges including a rising edge and a falling edge of a signal included in the incoming wave, the information on the plurality of edges including information on a rising time as information on the rising edge and information on a falling time as information on the falling edge;
comparing a power change amount of the frequency spectrum at a first edge of the plurality of edges with a first threshold value for each frequency;
specifying a frequency range in which the power change amount is larger than the first threshold value;
setting a second threshold value to a value obtained by multiplying a sum of power change amounts within the frequency range at a time of the first edge included in the information on the plurality of edges by a coefficient less than 1, the power change amounts corresponding to frequencies included in the frequency range, respectively; and
specifying a second edge in which a sum of powers in the frequency range changes over the second threshold value among the plurality of edges, the second edge having different directions of power change from the first edge, by a processor.

11. A non-transitory computer-readable recording medium storing a program that causes a computer to execute a procedure, the procedure comprising:
reading information on a frequency spectrum of an incoming wave and information on a plurality of edges including a rising edge and a falling edge of a signal included in the incoming wave, the information on the plurality of edges including information on a rising time as information on the rising edge and information on a falling time as information on the falling edge;
comparing a power change amount of the frequency spectrum at a first edge of the plurality of edges with a first threshold value for each frequency;
specifying a frequency range in which the power change amount is larger than the first threshold value;
setting a second threshold value to a value obtained by multiplying a sum of power change amounts within the frequency range at a time of the first edge included in the information on the plurality of edges by a coefficient less than 1, the power change amounts corresponding to frequencies included in the frequency range, respectively; and
specifying a second edge in which a sum of powers in the frequency range changes over the second threshold value among the plurality of edges, the second edge having different directions of power change from the first edge.

* * * * *